(12) United States Patent
Ochiai et al.

(10) Patent No.: US 7,597,349 B2
(45) Date of Patent: Oct. 6, 2009

(54) AIR BAG DEVICE

(75) Inventors: Fumiharu Ochiai, Nasushiobara (JP);
Fumitoshi Yasuhara, Utsunomiya (JP);
Atsushi Nakajima, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 365 days.

(21) Appl. No.: 11/459,960

(22) Filed: Jul. 26, 2006

(65) Prior Publication Data
US 2007/0029764 A1   Feb. 8, 2007

(30) Foreign Application Priority Data
Aug. 5, 2005   (JP)   ............... 2005-227661
Aug. 19, 2005  (JP)   ............... 2005-238379

(51) Int. Cl.
*B60R 21/21* (2006.01)

(52) U.S. Cl. .................................. 280/730.2

(58) Field of Classification Search .............. 280/730.2; B60R 21/21
See application file for complete search history.

(56) References Cited

U.S. PATENT DOCUMENTS

| 2007/0170705 A1* | 7/2007 | Lindemann et al. ...... 280/730.2 |
| 2008/0211207 A1* | 9/2008 | Sato ........................ 280/728.2 |
| 2009/0085332 A1* | 4/2009 | Tonooka et al. .......... 280/728.3 |

FOREIGN PATENT DOCUMENTS

| JP | 2941879 | 6/1999 |
| WO | WO-2005090132 A1 * | 9/2005 |

* cited by examiner

*Primary Examiner*—Paul N. Dickson
*Assistant Examiner*—Joselynn Y. Sliteris
(74) *Attorney, Agent, or Firm*—Rankin, Hill & Clark LLP

(57) ABSTRACT

This air bag device includes: an air bag which is arranged between an under-window panel and a lining that covers a cabin interior side thereof, and develops upward along an inner surface of a window; and a pressing member which presses a bottom portion of the air bag toward the under-window panel while developing the air bag. The bottom portion of the air bag and the under-window panel overlap with each other at a predetermined length along a vertical direction.

4 Claims, 17 Drawing Sheets

AIR BAG DEVICE

BACKGROUND OF THE INVENTION

Priority is claimed on Japanese Patent Application No. 2005-227661, filed Aug. 5, 2005, and Japanese Patent Application No. 2005-238379, filed Aug. 19, 2005, the contents of which are incorporated herein by reference.

1. Field of the Invention

The present invention relates to an air bag device having an air bag that develops upward along a window from below a window.

2. Description of the Related Art

Among air bag devices used as occupant protective devices mounted in a vehicle, a door-mounted type air bag device is proposed which is provided with an air bag arranged between an inner panel of a door and a lining that covers a cabin interior side of the door, and develops upward along an inner surface of the window (for example, refer to Japanese Patent No. 2,941,879).

As another type of air bag device having an air bag that develops along an inner surface of a window, a roof-side type air bag is proposed which is provided with an air bag that develops downward from a roof-side frame arranged on an upside of the window. This roof-side air bag is provided with a member called a tension line which connects between a pillar and the air bag in order to stabilize a developing direction of the air bag.

However, in the case in which air bag devices such as the above-mentioned door-mounted type air bag is adopted which develops an air bag upward from below a window, it was difficult to provide the tension line thereto due to the structural difficulties. Accordingly, since the tension line cannot be provided, there is a possibility in that a developing direction of the air bag becomes unstable.

The present invention was made in view of the above-mentioned circumstances, and has a first object of providing an air bag device which enables obtaining a stable developing direction of an air bag even though the air bag device has a construction of developing the air bag upward from below a window.

By the way, the above-mentioned air bag device had a difficulty in precisely controlling internal pressure of the developed air bag.

The present invention also has a second object of providing an air bag device which enables precise controlling of the internal pressure of the air bag even though the air bag device has a construction of developing the air bag along an inner surface of a window.

SUMMARY OF THE INVENTION

In order to achieve the above-mentioned first object, the present invention adopts the followings.

(1) An air bag device of the present invention includes: an air bag which is arranged between an under-window panel and a lining that covers a cabin interior side thereof, and develops upward along an inner surface of a window; and a pressing member which presses a bottom portion of the air bag toward the under-window panel while developing the air bag. The bottom portion of the air bag and the under-window panel overlap with each other at a predetermined length along a vertical direction.

According to the air bag device of the above (1), when the air bag is developed, the bottom portion thereof overlaps with the under-window panel at the predetermined length along a vertical direction. Furthermore, the air bag is pressed by the pressing member toward the under-window panel; therefore, the air bag is sandwiched between the under-window panel and the pressing member. Accordingly, the developing direction of the air bag can be stable. In addition, the developing air bag is pressed by the pressing member toward the under-window panel; therefore, a contacting area between the air bag and the under-window panel can be increased. Accordingly, a reaction force (i.e., a force for pressing an occupant back into the cabin interior side) produced by the air bag when the occupant contacts thereto will increase; therefore, the air bag device enables improving performance thereof.

(2) The air bag device according to the above (1), wherein the pressing member is a plate member which covers a cabin interior side of the bottom portion while developing the air bag, and has a shape which prevents blocking of a developing direction of the air bag.

According to the air bag device of the above (2), since the pressing member is the plate member having the above-mentioned shape, the pressing member can be manufactured and installed easily. Accordingly, it becomes possible to prevent increasing costs of the air bag device.

(3) The air bag device according to the above (2), wherein an upper portion of the pressing member inclines toward the cabin interior side.

According to the air bag device of the above (3), the pressing member can reliably prevent blocking of a development of the air bag. In addition, the pressing member can also serve as a member for supporting the lining when the lining is pressed from the cabin interior side.

(4) The air bag device according to the above (1), wherein the pressing member is a connecting member which connects between the bottom portion and the under-window panel while developing the air bag.

According to the air bag device of the above (4), since the pressing member is a connecting member which connects between the bottom portion and the under-window panel while developing the air bag, the pressing member can be formed by, for example, a fabric. In addition, the pressing member can be folded together with the air bag before developing the air bag. Accordingly, space for installing the pressing member can be small.

(5) The air bag device according to the above (4), wherein the pressing member connects between a non-expanding portion of the air bag and the under-window panel.

According to the air bag device of the above (5), by connecting between the non-expanding portion which does not expand and the under-window panel, distance between the non-expanding portion and the under-window panel can be maintained into substantially constant while developing the air bag. Accordingly, the pressing member can reliably support the developing air bag.

(6) The air bag device according to the above (5), wherein the pressing member is a band-shaped fabric.

According to the air bag device of the above (6), the pressing member can be folded together with the air bag before developing the air bag. Accordingly, space for installing the pressing member can be small.

(7) The air bag device according to the above (5), wherein the pressing member is a connecting member which directly fixes the non-expanding portion to the under-window panel.

According to the air bag device of the above (7), since the non-expanding portion is directly connected to the under-window panel by the pressing member, connection between the non-expanding portion and the under-window panel can be strong and reliable. Accordingly, it is possible to reliably limit the developing direction of the air bag.

(8) The air bag device according to the above (5), wherein a plurality of the pressing members are provided along a surface of the air bag.

According to the air bag device of the above (8), it is possible to prevent rotations of the air bag while developing the air bag.

(9) The air bag device according to the above (1), wherein the air bag has a vent hole directing a cabin exterior side.

According to the air bag device of the above (9), it is also possible to achieve the above-mentioned second object. Therefore, it becomes possible to precisely control the internal pressure of the air bag by setting at least one of, for example, the shape, the dimension, the number, and the position, of the vent hole. In addition, since the vent hole directs the cabin exterior side, it becomes possible to prevent blocking of gas exhausted from the vent hole. Therefore, it is possible to reliably control the internal pressure of the air bag. Furthermore, in the case in which the vent hole is directed to the window side, the air bag can be developed toward the cabin interior side by a thrust force generated by the gas exhausted from the vent hole. Accordingly, a reaction force (i.e., a force for pressing an occupant back into the cabin interior side) produced by the air bag when the occupant contacts thereto can be increased.

(10) The air bag device according to the above (9), wherein the vent hole directs along a length direction of the air bag.

According to the air bag device of the above (10), it is also possible to suppress vibrations in the length direction of the air bag, by a thrust force of the gas exhausted from the vent hole.

(11) The air bag device according to the above (9), wherein the air bag includes an expanding portion which expands along a lateral direction of the air bag so as to override an accommodating portion which accommodates the air bag, while developing the air bag, and wherein the vent hole is formed at an upper portion of the expanding portion.

According to the air bag device of the above (11), since the vent hole is formed at the upper portion of the expanding portion, it is also possible to suppress vibrations in the vertical direction of the expanding portion, by a thrust force of the gas exhausted from the vent hole.

(12) The air bag device according to the above (10), wherein the air bag includes an expanding portion which expands along a lateral direction of the air bag so as to override an accommodating portion which accommodates the air bag, while developing the air bag, and wherein the vent hole is formed at an upper portion of the expanding portion.

According to the air bag device of the above (12), the same operations and the same advantageous effects can be obtained as those of the air bag device of the above (11).

(13) The air bag device according to the above (11), wherein the vent hole is also formed at a lower portion of the expanding portion.

According to the air bag device of the above (13), by providing the vent hole to the lower portion in addition to the upper portion of the air bag, the vent holes can direct upward and downward on the vehicle exterior side. Therefore, it is possible to suppress vibrations in the vertical direction of the expanding portion while developing the air bag, by thrust forces of the gas exhausted from the vent holes.

(14) The air bag device according to the above (12), wherein the vent hole is also formed at a lower portion of the expanding portion.

According to the air bag device of the above (14), the same operations and the same advantageous effects can be obtained as those of the air bag device of the above (13).

DETAILED DESCRIPTION OF THE INVENTION

First Embodiment

A first embodiment of the air bag device according to the present invention will be explained below with reference to FIGS. 1 to 4.

Figure 1:
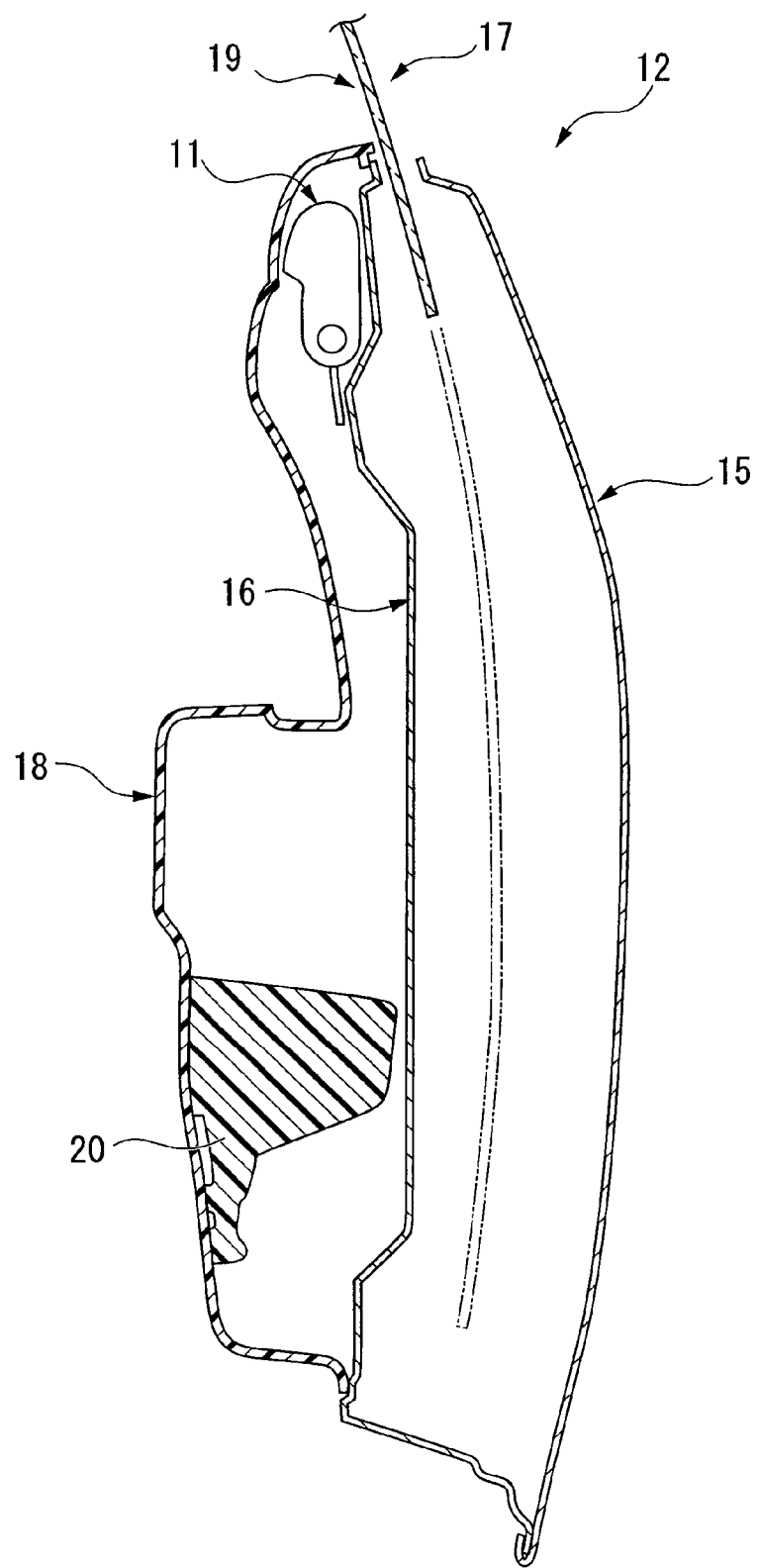
FIG. 1 shows a cross-sectional view of a door provided with an air bag device according to a first embodiment of the present invention.
Figure 11:
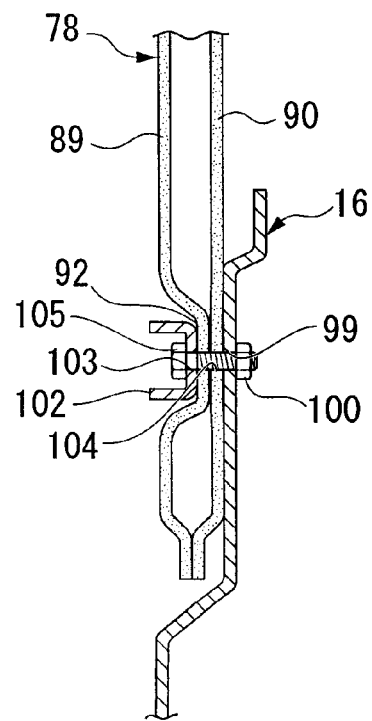
FIG. 11 shows a cross-sectional view of the same variant example.

FIG. 11 shows a cross sectional view of a door 12 on the right side of a vehicle in which an air bag device 11 according to the present embodiment is provided. In FIG. 1, the left side of the sheet is the cabin interior side, and the right side of the sheet is the vehicle exterior side. The vehicle of the present embodiment is an open-roof type vehicle in which a roof thereof can be opened and closed or is detachable. In the following explanation, it is assumed that the door 12 is in a closed state.

The door 12 is provided with: a metal outer panel 15 which is disposed along the vehicle longitudinal direction on the cabin exterior side, and composes a design surface on the cabin exterior side; a metal inner panel (panel) 16 which is disposed along the vehicle longitudinal direction on the cabin interior side of the outer panel 15; a window glass 17 which is disposed along the vehicle longitudinal direction, between the outer panel 15 and the inner panel 16, rises so as to extend upward therebetween, and is movable upward and downward; and a door lining (lining) 18 which covers the cabin interior side of the inner panel 16, and forms a design surface on the cabin interior side. A window 19 is formed above the outer panel 15, the inner panel 16, and the door lining 18. The window 19 is opened and closed by raising and lowering the window glass 17 that constitutes one portion thereof. The outer panel 15, the inner panel 16, and the door lining 18 are disposed on the lower side of the window 19, that is, below the window 19. The metal outer panel 15 and the inner panel 16 are high rigidity portions of the door 12, and constitute one portion of the vehicle body when the door is closed. A lower impact absorption member 20 for absorbing the impact near the hip of an occupant when the occupant slams into the door 12 is provided at a bottom portion between the inner panel 16 and the door lining 18.

Figure 2:
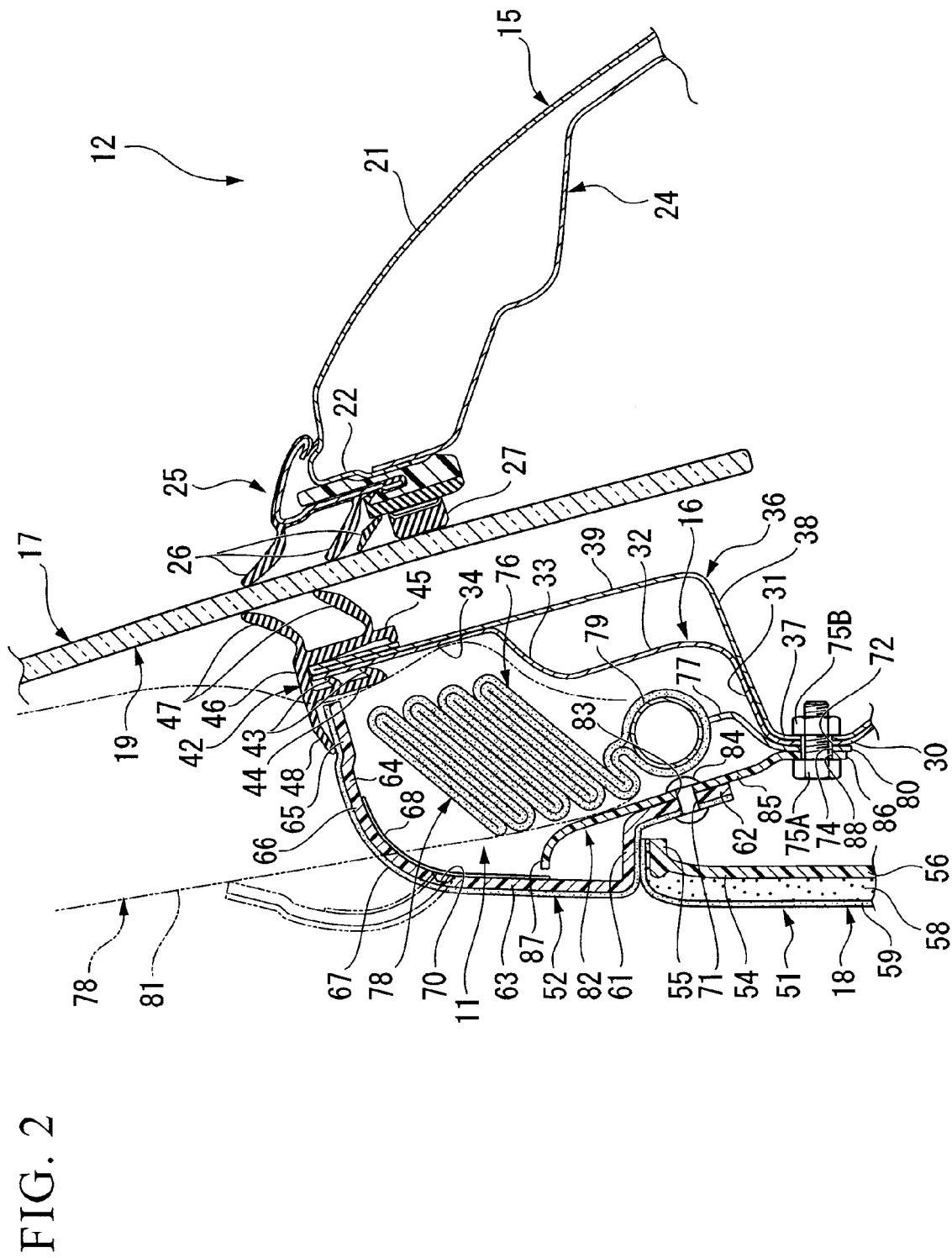
FIG. 2 shows an enlarged cross-sectional view of an upper portion of the door.

FIG. 2 shows a cross sectional view of an upper portion of the door 12 in greater detail. The outer panel 15 includes: an external panel portion 21 which constitutes a design surface on the cabin exterior side, and has an upper portion extending upward while sloping to the cabin interior side; and a joining panel portion 22 which is formed so as to be folded back at an upper portion and extends downward. A metal outer side reinforcement panel 24 which reinforces the upper portion of the outer panel 15 and is formed so as to approach the outer panel 15 side, is joined to the cabin exterior side of a lower portion of the joining panel portion 22. An outer side weather strip 25 is attached to the upper side of a joined portion of the outer panel 15 and the outer side reinforcement panel 24, so as to seal a gap formed between the joined portion and the window glass 17. The outer side weather strip 25 has a plurality of sealing lips 26 arranged in the vertical direction and a square bar-shaped sealing member 27 disposed thereunder. The sealing lips 26 and the sealing member 27 seal the gap by being in contact with the window glass 17.

An upper portion of the inner panel 16 has: an inside plate portion 30 disposed on the cabin interior side; a step plate portion 31 which extends upward while sloping from an upper edge of the inside plate portion 30 toward the cabin exterior side; a middle plate portion 32 which extends upward while sloping from an outer edge portion of the step plate portion 31 on the outside in the vehicle width direction to the cabin interior side; a step plate portion 33 which extends upward while sloping from an upper edge of the middle plate portion 32 toward the cabin exterior side; and an upper plate portion 34 which extends upward while sloping from an outer side edge of the step plate portion 33 in the vehicle width direction to the cabin interior side. A metal inner reinforcing panel 36 is joined to the cabin exterior side of the upper portion of the inner panel 16 for reinforcing the upper portion of the inner panel 16.

The inner reinforcing panel 36 includes: an inside plate portion 37 which is joined to the cabin exterior side of the inside plate portion 30 of the inner panel 16; a step plate portion 38 which extends upward while sloping from an upper edge of the inside plate portion 37 toward the cabin exterior side, and is joined to the bottom side of the step plate portion 31 of the inner panel 16; and an upper plate portion 39 which extends upward while sloping from an outer side edge of the step plate portion 38 in the vehicle width direction to the cabin interior side, and is joined to the cabin exterior side of the upper plate portion 34 of the inner panel 16. The step plate portion 31, the middle plate portion 32, the step plate portion 33, and the upper plate portion 34 of the inner panel 16, together with the step plate portion 38 and the upper plate portion 39 of the inner reinforcing panel 36 form a closed-section structure.

An inner side weather strip 42 is attached at an upper portion of a joined portion of the inner panel 16 and the upper plate portion 39 of the inner reinforcing panel 36, so as to sandwich the upper plate portions 34 and 39; and thereby, sealing a gap formed between the joined portion and the window glass 17. This inner side weather strip 42 includes: a pinching piece 44 which is disposed on the cabin interior side of the upper plate portion 34, and has a plurality of engaging tongue pieces 43 that extend to the cabin exterior side; a pinching piece 45 which is disposed on the cabin exterior side of the upper plate portion 39; and a coupling portion 46 which couples the upper portions of the pinching pieces 44 and 45. The upper plate portions 34 and 39 are sandwiched by the pinching piece 44 and the pinching piece 45. The inner side weather strip 42 includes: a plurality of sealing lips 47 arranged in the vertical direction, and extending from the pinching piece 45 in the direction of the window glass 17, and thereby being contact with the window glass 17; and a contact tongue piece 48 which extends to the cabin interior side to form an approximately coplanar surface with the coupling portion 46.

The door lining 18 includes: a lining body 51 that forms middle and lower portions of the door lining 18; and an upper lining 52 that is disposed between the lining body 51 and the inner side weather strip 42.

An upper portion of the lining body 51 includes: a comparatively hard lining core material 56 which has a main plate portion 54 extending in the vertical direction, and a projection plate portion 55 projecting slightly from an upper end of the main plate portion 54 to the cabin exterior side; a soft lining base material 58 which covers the cabin interior side of the lining core material 56; and a skin material 59 which covers a cabin interior side and an upper side of the lining base material 58.

The upper lining 52 includes: a comparatively hard lining core material 66; a skin material 67 which completely covers a cabin interior side and an upper side of the lining core material 66; and a covering material 68 which covers a cabin exterior side from a middle plate portion 63 to an upper plate portion 64. The lining core material 66 includes: a mounting plate portion 61 which is horizontally arranged on a top of the lining body 51; a support plate portion 62 which extends downward while sloping from a cabin exterior side outer edge of the mounting plate portion 61 to the cabin exterior side; a middle plate portion 63 which extends upward from a cabin interior side inner edge of the mounting plate portion 61; an upper plate portion 64 which extends upward, sloping to the cabin exterior side, while curving from an upper edge of the middle plate portion 63; and a step plate portion 65 which extends to the cabin exterior side while forming a step downward from a cabin exterior side outer edge of the upper plate portion 64. The upper lining 52 is joined with and fixed to the upper portion of the lining body 51 at a position of the mounting plate portion 61.

The contact tongue piece 48 of the inner side weather strip 42 contacts with the top side of the step plate portion 65 of the upper lining 52. A groove 70 that extends in the longitudinal direction of the vehicle is formed at a boundary of the middle plate portion 63 and the upper plate portion 64 in the lining core material 66 of the upper lining 52. A mounting hole 71 which penetrates both of the support plate portion 62 and the skin material 67 is formed at the support plate portion 62 of the upper lining 52.

A mounting hole 72 is formed in the inside plate portion 30 of the inner panel 16 and the inside plate portion 37 of the inner reinforcing panel 36, so as to penetrate them. In the air bag device 11 of the present embodiment, an air bag module 76 is installed between upper portions of the inner panel 16 and the door lining 18 by: inserting a bolt 75A from the cabin interior side into a mounting hole 74 formed at a bottom portion of the air bag module 76; further inserting the bolt 75A into the mounting hole 72; and thereafter screwing the bolt 75A into a weld nut 75B fixed at the cabin exterior side of the inside plate portion 37 of the inner reinforcing panel 36. The air bag module 76 includes: a supporting plate 77 which extends upward, sloping to the cabin exterior side from a mounting plate portion 80 in which the mounting hole 74 is formed; an air bag 78 which is mounted to the supporting plate 77 and is folded so as to be successively piled upward while in a shrinking state; an inflator (not illustrated) which is filled with a propellant that generates high pressure gas (fluid) by combustion; and a pipe 79 which is fitted into the inside of the air bag 78 on the supporting plate 77 side, and connects between the inflator and the inside of the bottom portion of the air bag 78.

The air bag 78 is folded so as to be piled successively upward with respect to the pipe 79 being the gas supply portion. Therefore, when the air bag 78 is developed by the gas generated by the inflator, the air bag 78 basically develops such that an expanding portion 81 expands upward. At this time, the pipe 79 is disposed at a position that is vertically lower than an upper end portion of the inner panel 16. Therefore, a bottom portion of the expanding portion 81 expands upward from the pipe 79 and overlaps with the inner panel 16 at a predetermined length along the vertical direction.

The air bag device 11 of the present embodiment is provided with a plastic (or metal) plate member (a pressing member) 82 arranged between the air bag module 76 and the upper lining 52. The plate member 82 includes a plurality of mounting holes 83 along the vehicle length direction. The plate member 82 is attached to the upper lining 52 by inserting rivets 84 into the mounting holes 83 and 71 after matching positions of the mounting holes 83 and the mounting holes 71 of the upper lining 52, and then by caulking the rivets 84. The groove 70 of the upper lining 52 is formed at a position higher than a mounting position by the rivets 84 of the plate member 82 with respect to the upper lining 52.

The plate member 82 includes: a main plate portion 85 which is attached to the support plate portion 62 so as to follow the support plate portion 62 of the lining core material 66 (i.e., so as to be more inclined toward the cabin interior side as directing upward) in the mounted state, and extends upward so as to be higher than the support plate portion 62; a connecting plate portion 86 which extends downward from a bottom end portion of the main plate portion 85, and is fixed by the bolt 75A together with the air bag module 76 at a mounting hole 88; a curving plate portion 87 which extends from an upper end portion of the main plate portion 85 while curving toward a cabin interior side until reaching to a position in front of the upper lining 52. The plate member 82 includes only the main plate portion 85, connecting plate portion 86, and the curving plate portion 87. An upper end side of the plate member 82, where is higher than a connecting position with respect to the support plate portion 62 of the lining core material 66 is not restricted by other members, and is therefore free from the other members.

The pipe 79 connects the inflator and the air bag 78. The pipe 79 is disposed at a position that is vertically lower than an upper end portion of the plate member 82. Therefore, the bottom portion of the expanding portion 81 of the air bag 78 which expands upward from a position of the pipe 79 overlaps with the plate member 82 at a predetermined length along a vertical direction during the development thereof. That is, the plate member 82 covers a cabin interior side of the bottom portion of the expanding portion 81 during the development of the air bag 78. In addition, the distance between the plate member 82 and the inner panel 16 is made so as to be shorter the dimension of the expanded expanding portion 81 of the air bag 78. Accordingly, the plate member 82 presses the bottom portion of the expanding portion 81 toward the inner panel 16 while developing the air bag 78.

In the air bag device 11 of the present embodiment, when the deployment condition is met during a vehicle collision, such as a G-force equal to or greater than a predetermined amount being detected, the inflator ignites. Then the folded-up air bag 78 is expanded by the gas generated by the inflator. Since the air bag 78 is folded in a manner to be successively overlapped upward, it develops so as to extend upward from below the window 19 as shown by the double-dashed line shown in FIG. 2. At this time, the position of the pipe 79 connecting the inflator and the air bag 78 is lower than upper end portions of the inner panel 16 and the plate member 82; therefore, the air bag 78 develops while being guided by the plate member 82 on the cabin interior side, and also being guided by the inner panel 16 on the cabin exterior side. During deployment, the air bag 78 mainly presses the upper plate portion 64 in the upper lining 52. Thereby, an upper portion of the upper lining 52 is rotated so as to override the contact tongue piece 48 centering on the weak groove 70. Thereafter, the air bag 78 develops upward along the inner surface of the window glass 17 of the window 19 above. At this time, the distance between the plate member 82 and the inner panel 16 is narrower than the expanded thickness of the expanding portion of the air bag 78; therefore, during the development of the air bag 78, the plate member 82 presses the bottom portion of the expanding portion 81 toward the inner panel 16. As a result, a contacting area between the air bag 78 and the inner panel 16 becomes large.

Figure 3:
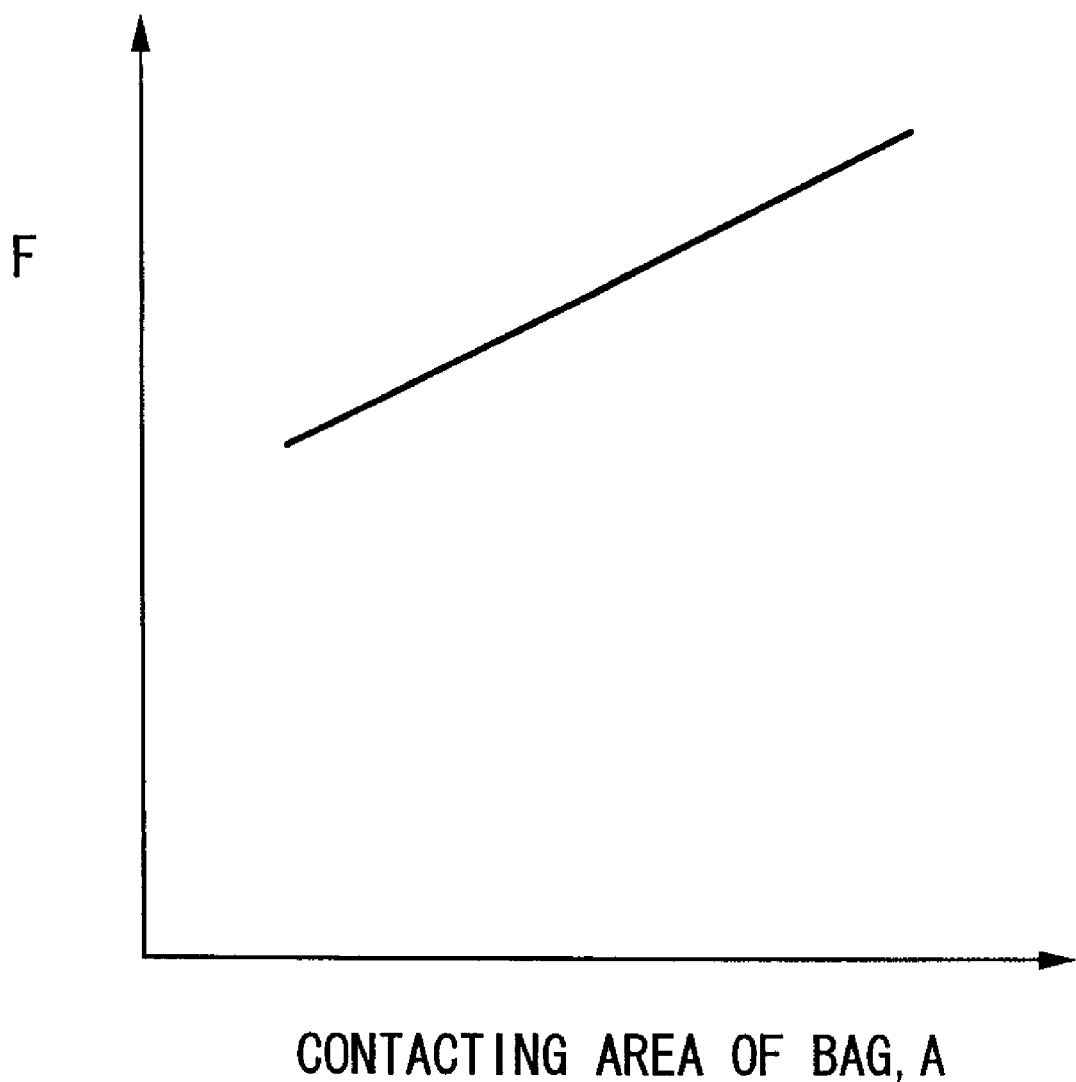
FIG. 3 shows a characteristic diagram indicating a relationship between: a contacting area between an air bag and an inner panel; and a reaction force of the air bag.
Figure 4:
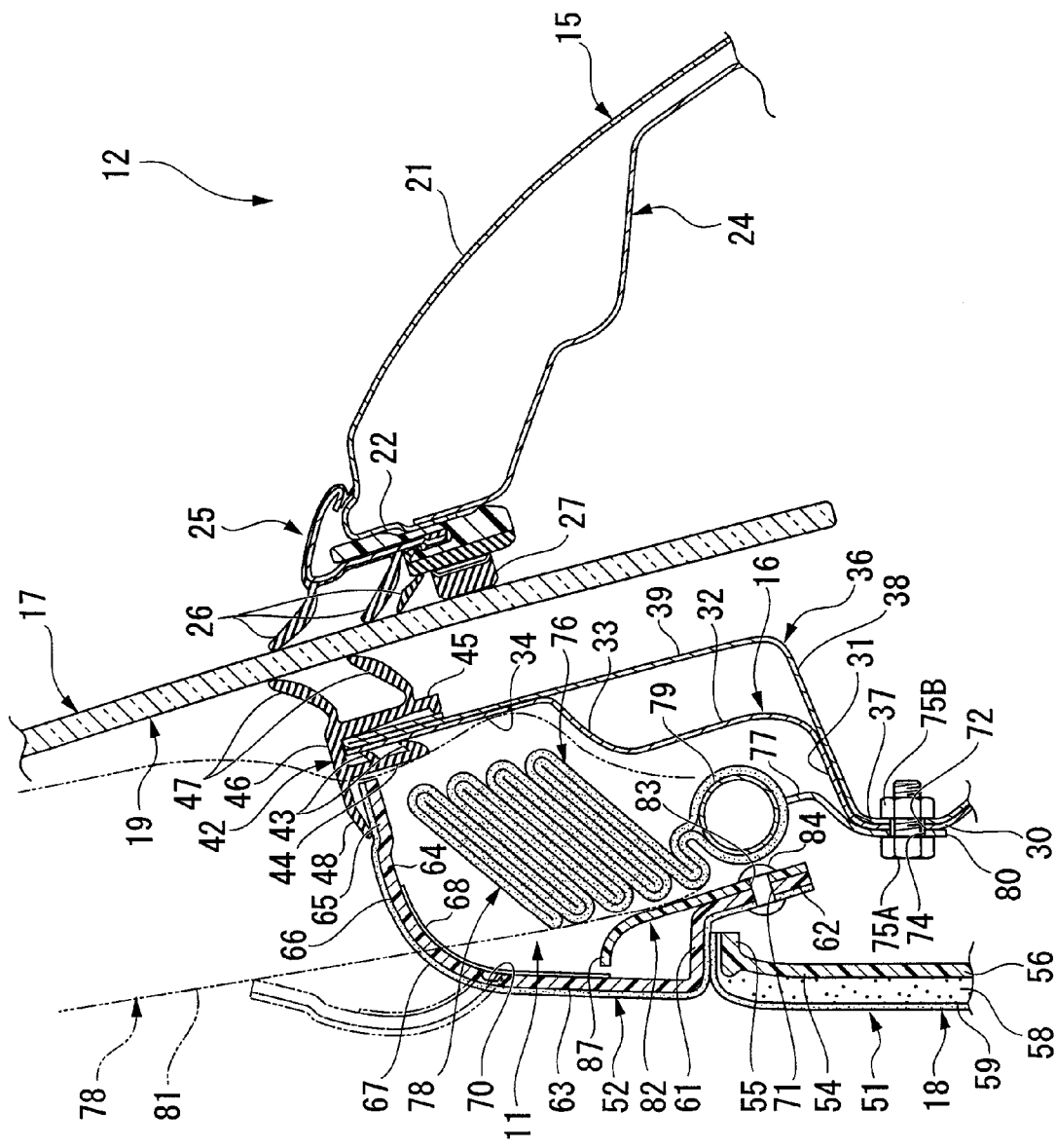
FIG. 4 shows an enlarged cross-sectional view of an upper portion of the door provided with a variant example of the air bag device.

According to the air bag device 11 of the present embodiment explained in the above, when the air bag 78 is developed, the bottom portion of the expanding portion 81 overlaps with the inner panel 16 at the predetermined length along the vertical direction; and furthermore, the plate member 82 presses the expanding portion 81 toward the inner panel 16. Accordingly, the developing direction of the air bag 78 can be stable. In addition, the developing air bag 78 is pressed by the plate member 82 toward the inner panel 16; therefore, the contacting area between the air bag 78 and the inner panel 16 can be increased. As shown in FIG. 3, the contacting area between the air bag 78 and the inner panel 16, and a reaction force (i.e., a force for pressing an occupant back into the cabin interior side) produced by the air bag 78 when the occupant contacts thereto have a proportional relationship in which the reaction force increases as the contacting increases. Therefore, since the reaction force to be generated when the occupant contacts with the air bag 78 can be increased by increasing the contacting area, the air bag 78 can improve the performance thereof.

In addition, in the present embodiment, the air bag 78 is pressed toward the inner panel 16 by the plate member 82 which covers the cabin interior side of the bottom portion of the expanding portion 81 while developing the air bag 78, and has a shape which prevents blocking of the developing direction of the air bag 78 (i.e., a shape which prevents overlapping with the air bag 78). The plate member 82 can be manufactured easily, and also can be installed easily. Accordingly, the air bag device 11 can prevent increasing cost thereof.

Moreover, in the present embodiment, a case has been explained in which the plate member 82 is attached to the upper lining 52 by the rivets 84, and is also attached to the inner panel 16 by the bolt 75A and the weld nut 75B. However, as shown in for example FIG. 4, the plate member 82 may be attached only to the upper lining 52. In this case, in especially, since the plate member 82 is supported only by the upper lining 52, the groove 70 needs to be provided at a position higher than the plate member 82 such that the upper lining 52 is folded at the position higher than the plate member 82 while developing the air bag 78.

Second Embodiment

Next, an air bag device according to a second embodiment of the present invention will be explained below with reference to FIGS. 5 to 11. In the following explanation, differences of the present embodiment with respect to the above-mentioned first embodiment will be mainly explained. The same symbols will be added to the same constituent members as those of the first embodiment, and explanation thereof will be omitted here.

An air bag device 11 of the present embodiment has a different construction for pressing the bottom portion of the expanding portion 81 toward the inner panel 16 side while developing the air bag 78, with respect to the plate member 82 of the first embodiment.

Figure 5:
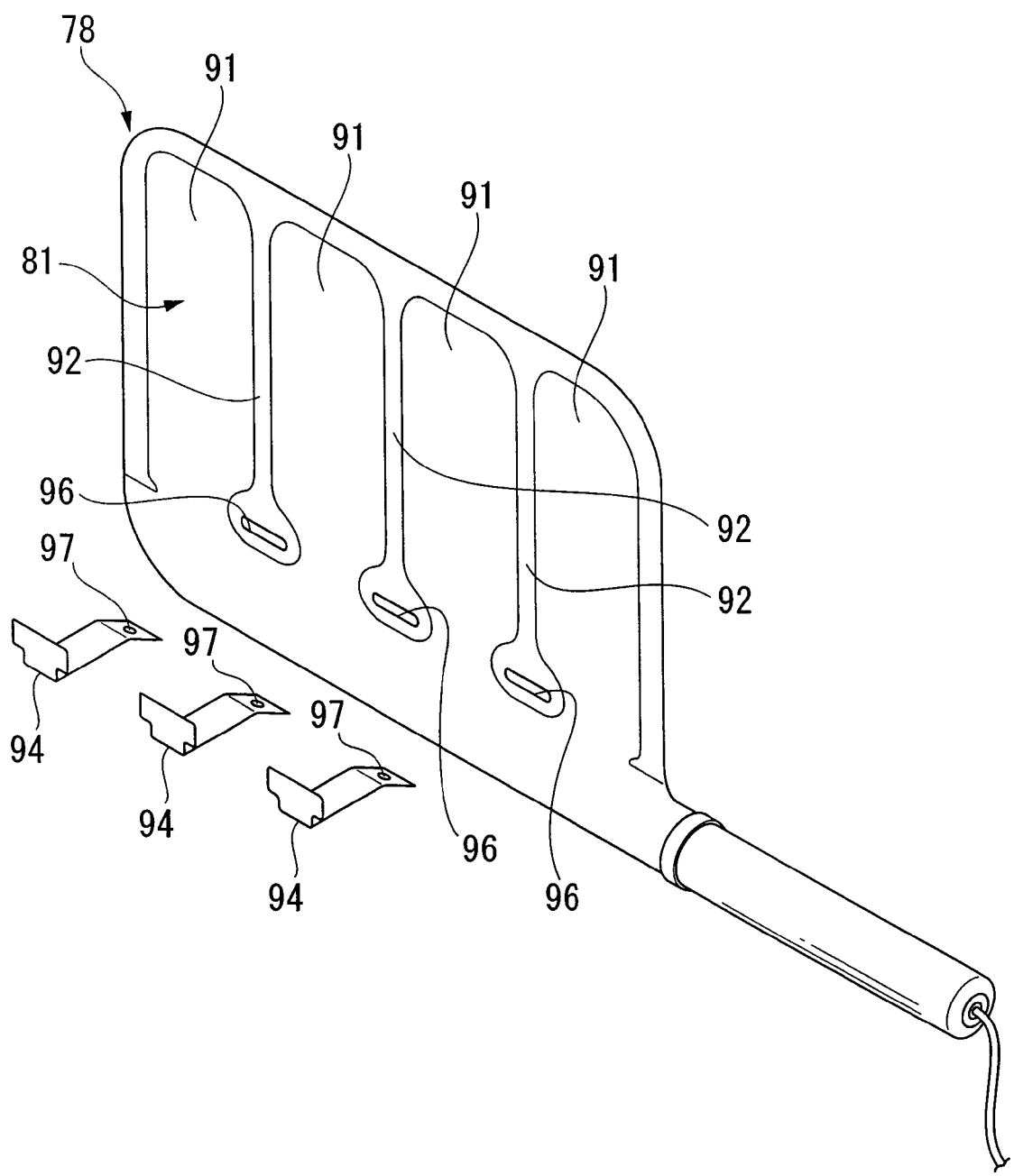
FIG. 5 shows an exploded perspective view showing an air bag device according to a second embodiment of the present invention.
Figure 6:
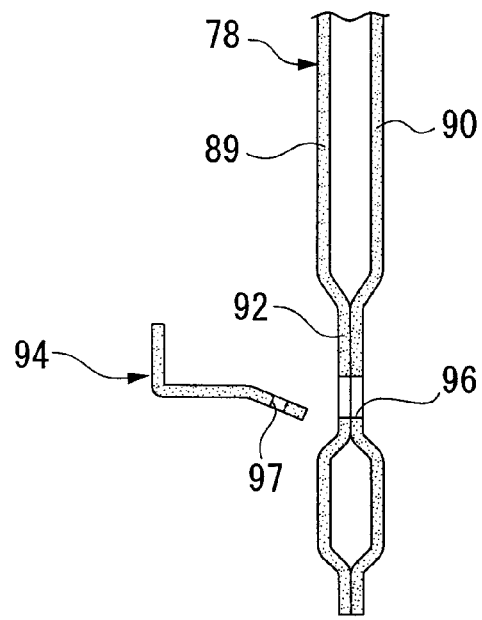
FIG. 6 shows an exploded cross-sectional view of the same air bag device.

As shown in FIG. 5, the air bag 78 of the present embodiment has long shape along the vehicle length direction as same as the first embodiment. In addition, as shown in FIG. 6, the air bag 78 is made by sewing a base fabric 89 on the vehicle interior side and a base fabric 90 on the vehicle exterior side. As shown in FIG. 5, the air bag 78 as a whole develops in a plate shape. The expanding portion 81 which expands while developing the air bag 78 includes: a plurality of cells 91 each of which expands in a cylindrical shape so as to extend in the vertical direction, and which are arranged side-by-side in the vehicle longitudinal direction; and non-expanding portions 92 each of which is formed between the cells 91 and does not expand. These cells 91 of the expanding portions 81 are formed by joining the base fabrics 89 and 90 together by sewing, adhesion or weaving such as jacquard weaving. The cells 91 as a whole inflate in a plate shape.

The air bag 78 further includes a plurality of connecting members 94 each of which is a band-shaped fabric arranged along the vehicle length direction, and connects between the bottom portion of the non-expanding portion 92 and the inner panel 16. The bottom portion of the expanding air bag 78 can be pressed toward the inner panel 16 by the connecting members 94 supporting therebetween.

Figure 7:
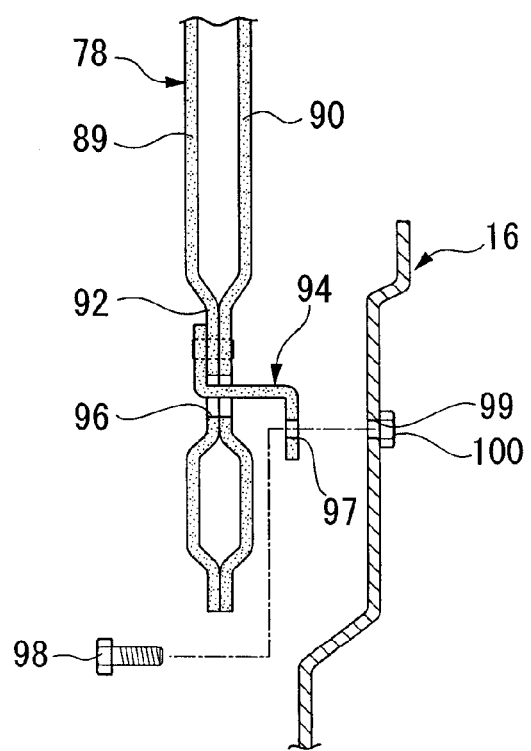
FIG. 7 shows an exploded cross-sectional view of the same air bag device.
Figure 8:
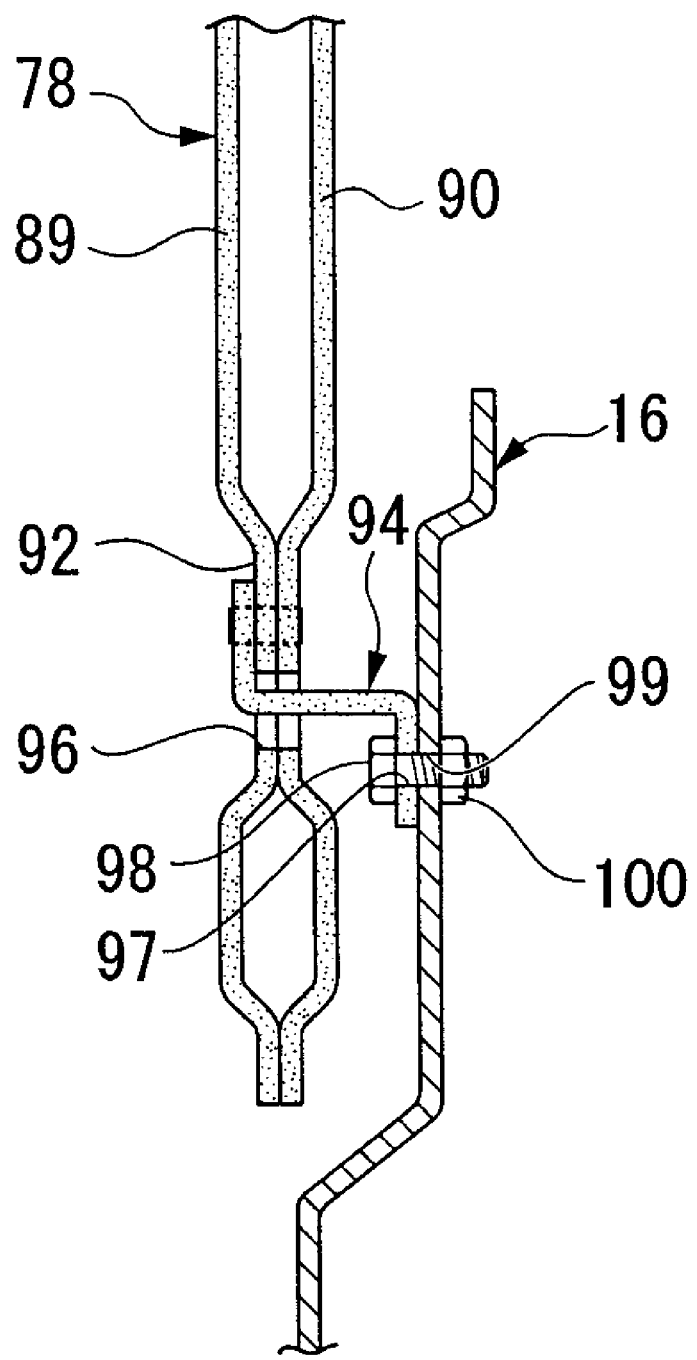
FIG. 8 shows a cross-sectional view of the same air bag device.

Specifically, as shown in FIGS. 6 to 8, one end sides of the connecting members 94 are fixed to the non-expanding portions 92 by, for example, being sewn to the non-expanding portions 92 in a state in which each of the connecting members 94 is inserted into the corresponding mounting holes 96 formed at the bottom portion of the non-expanding portions 92. The non-expanding portions 92 and the inner panel 16 are joined by the connecting members 94. That is, each bolts 98 is inserted into the corresponding mounting holes 97 formed at another ends of the connecting members 94; and each bolts 98 is screwed to the corresponding weld nuts 100 fixed to the cabin exterior side of the inner panel 16, after inserting the bolts 98 into the corresponding mounting holes 99 formed at the inner panel 16.

Also in the air bag device 11 of the present embodiment explained in the above, when the air bag 78 develops, the bottom portion of the expanding portion 81 overlaps with the inner panel 16 at the predetermined length in the vertical direction. Furthermore, since the bottom portion of the expanding portion 81 is pressed toward the inner panel 16 side by the connecting members 94, the developing direction of the air bag 78 can be stable. In addition, since the expanding portion 81 while developing the air bag 78 is pressed toward the inner panel 16 side by the connecting members 94, the contacting area between the expanding portion 81 and the inner panel 16 can be increased. Therefore, since the reaction force to be generated when the occupant contacts with the air bag 78 can be increased, the air bag 78 can improve performance thereof.

In addition, in the air bag device 11 of the present embodiment, the bottom portion of the expanding portion 81 is pressed toward the inner panel 16 while developing the air bag 78, by the connecting members 94 connecting between the non-expanding portions 92 and the inner panel 16. These connecting members 94 can be folded together with the air bag 78 before developing the air bag 78. Accordingly, space for arranging the connecting members 94 can be small.

Figure 9:
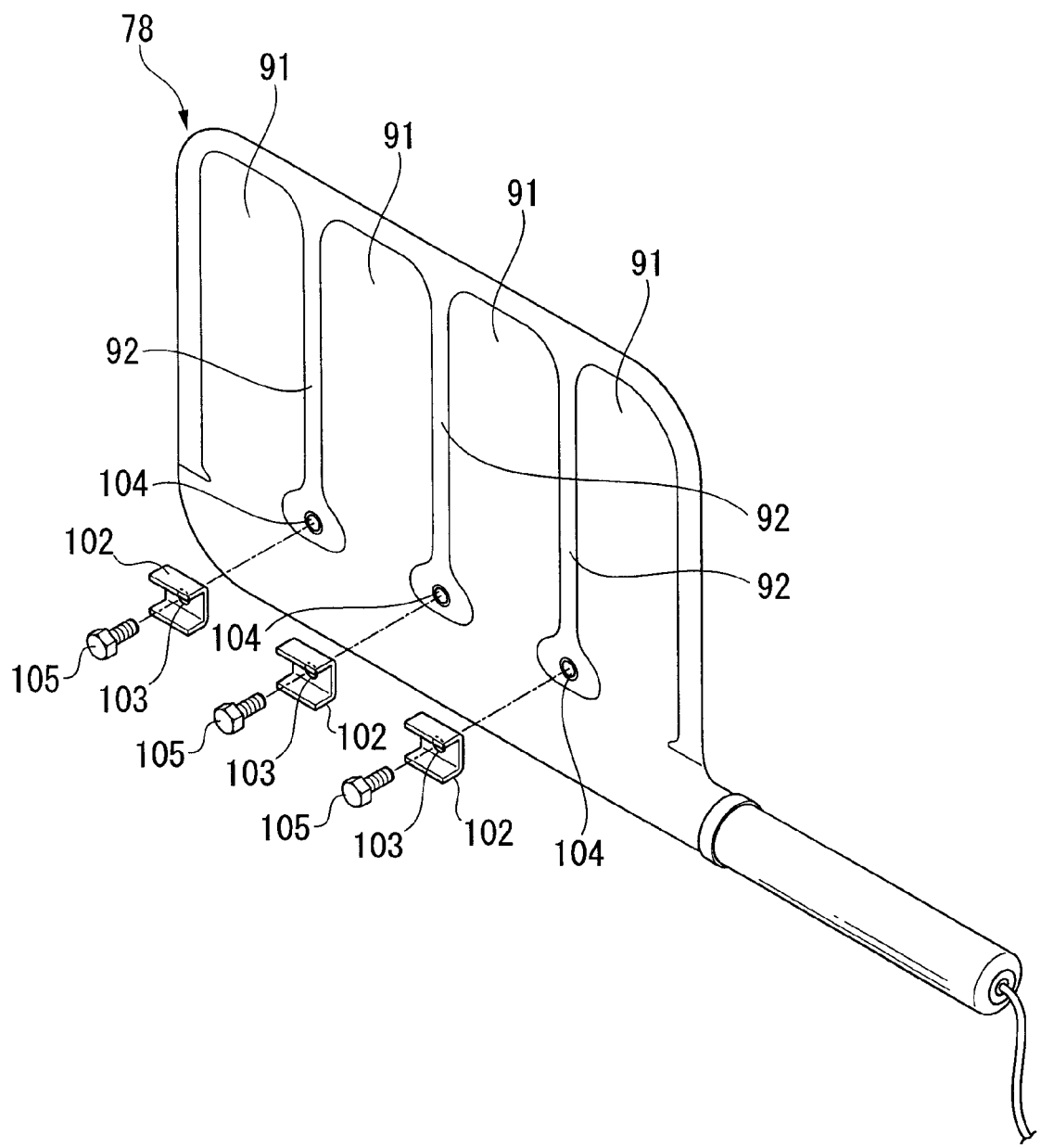
FIG. 9 shows an exploded perspective view showing a variant example of the same air bag device.
Figure 10:
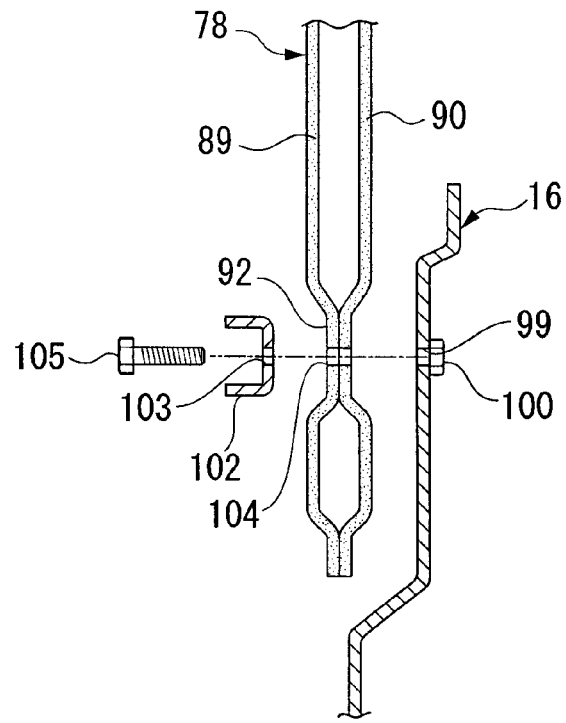
FIG. 10 shows an exploded perspective view of the same variant example.

Moreover, explanation has been given in the aforementioned embodiment using an example that the connecting members 94 are band-shaped fabric. However, the present invention is not limited thereto, and other members can be adopted instead of them as long as the connection between the bottom portion of the non-expanding portions 92 of the air bag 78 and the inner panel 16 can be obtained. For example, as shown in FIGS. 9 to 11, the non-expanding portions 92 of the air bag 78 and the inner panel 16 may be joined by a plurality of brackets 102 and bolts 105. That is, the brackets 102 are placed onto the cabin interior side of the non-expanding portions 92; then, the bolts (a connecting member) 105 are inserted into the mounting holes 103 of the brackets 102 and mounting holes 104 of the non-expanding portions 92; and then, the bolts 105 are fixed by screwing them to the weld nuts 100 fixed onto the cabin exterior side of the inner panel 16, after inserting the bolts 105 into the mounting holes 99 formed in the inner panel 16 side. Otherwise, the expanding portions 81 of the air bag 78 and the inner panel 16 may be connected by the connecting members 94. However, it is more preferable to connect the non-expanding portions 92 and the inner panel 16 since it enables easy sewing of the connecting members 94 to the air bag 78. Furthermore, the plate member 82 of the above first embodiment, and the connecting members 94 or the bolts 105 may be used by combined them together.

Moreover, explanations have been given in the aforementioned embodiments using examples that the air bag device 11 is provided in the door 12 of the vehicle. However, the present invention is not limited thereto. It may be applied as long as it is disposed below the window and develops the air bag along the inner surface of the window. For example, it may be applied to an air bag device that is provided below a rear side window in a coupe-type vehicle and applied to an air bag device that is provided below a tailgate window.

Third Embodiment

Next, an air bag device according to a third embodiment of the present invention will be explained below with reference to FIGS. 12 to 15.

Figure 12:
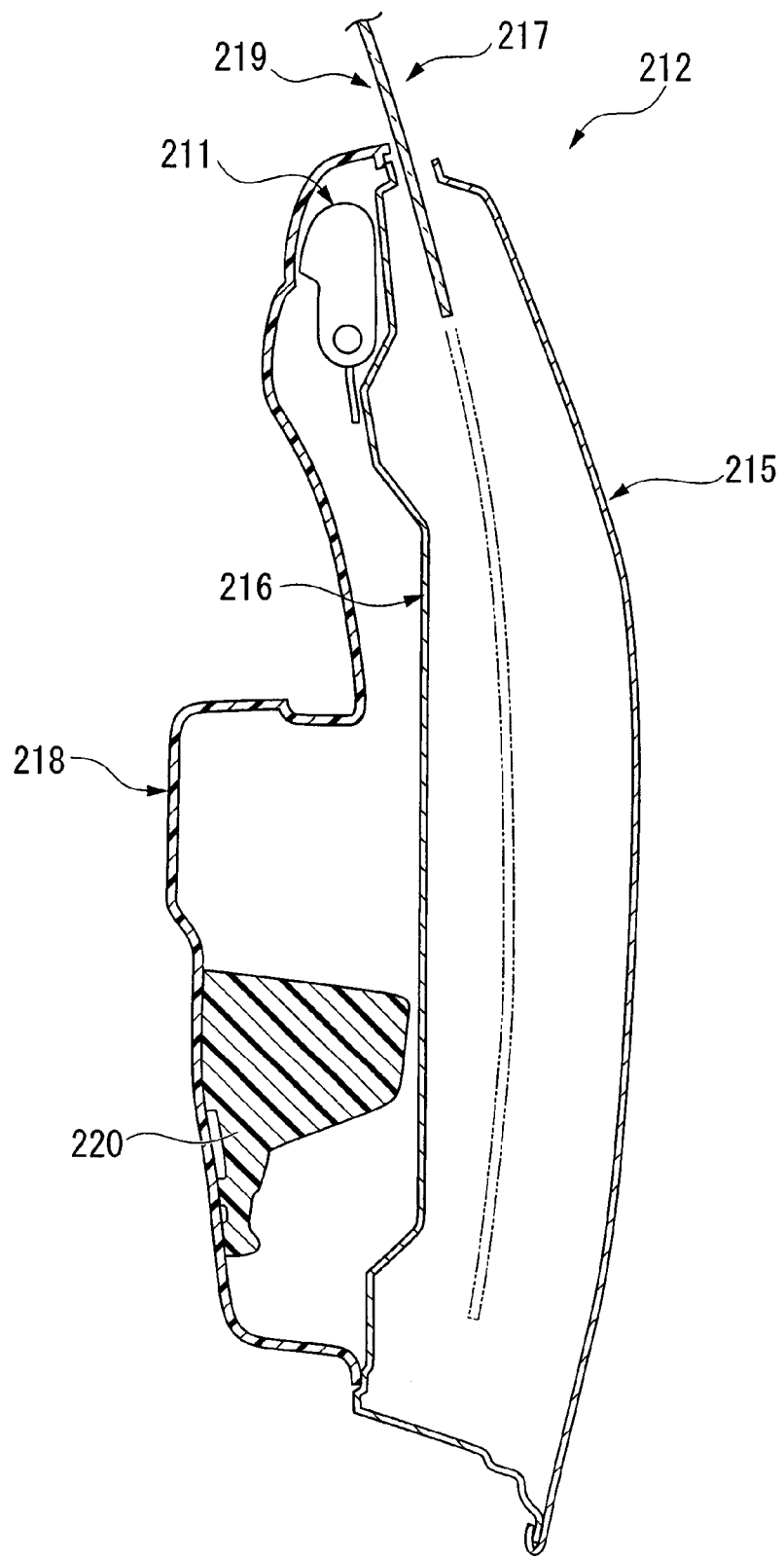
FIG. 12 shows a cross-sectional view of a door provided with an air bag device according to a third embodiment of the present invention.

FIG. 12 schematically shows a cross sectional view of a door 212 on the right side of a vehicle in which an air bag device 211 according to the present embodiment is provided. In FIG. 12, the left side of the sheet is the cabin interior side, and the right side of the sheet is the vehicle exterior side. The vehicle of the present embodiment is an open-roof type vehicle in which a roof thereof can be opened and closed or is detachable. In the following explanation, it is assumed that the door 212 is in a closed state.

The door 212 is provided with: a metal outer panel 215 which is disposed along the vehicle longitudinal direction on the cabin exterior side, and composes a design surface of the cabin exterior side; a metal inner panel 216 which is disposed along the vehicle longitudinal direction on the cabin interior side of the outer panel 215; a window glass 217 which is disposed along the vehicle longitudinal direction, between the outer panel 215 and the inner panel 216, rises so as to extend upward therebetween, and is movable upward and downward; and a door lining 218 which covers the cabin interior side of the inner panel 216, and forms a design surface of the cabin interior side.

A window 219 is formed above the outer panel 215, the inner panel 216, and the door lining 218. The window 219 is opened and closed by raising and lowering the window glass 217 that constitutes one portion thereof. The outer panel 215, the inner panel 216, and the door lining 218 are disposed at a location where are close to the window 219, and are on the lower side of the window 219 (i.e., below the window). The metal outer panel 215 and the inner panel 216 are high rigidity portions of the door 212, and constitute a portion of the vehicle body when the door is closed. A lower impact absorption member 220 for absorbing the impact near the hip of an occupant when the occupant slams into the door 212 is provided at a bottom portion between the inner panel 216 and the door lining 218.

Figure 13:
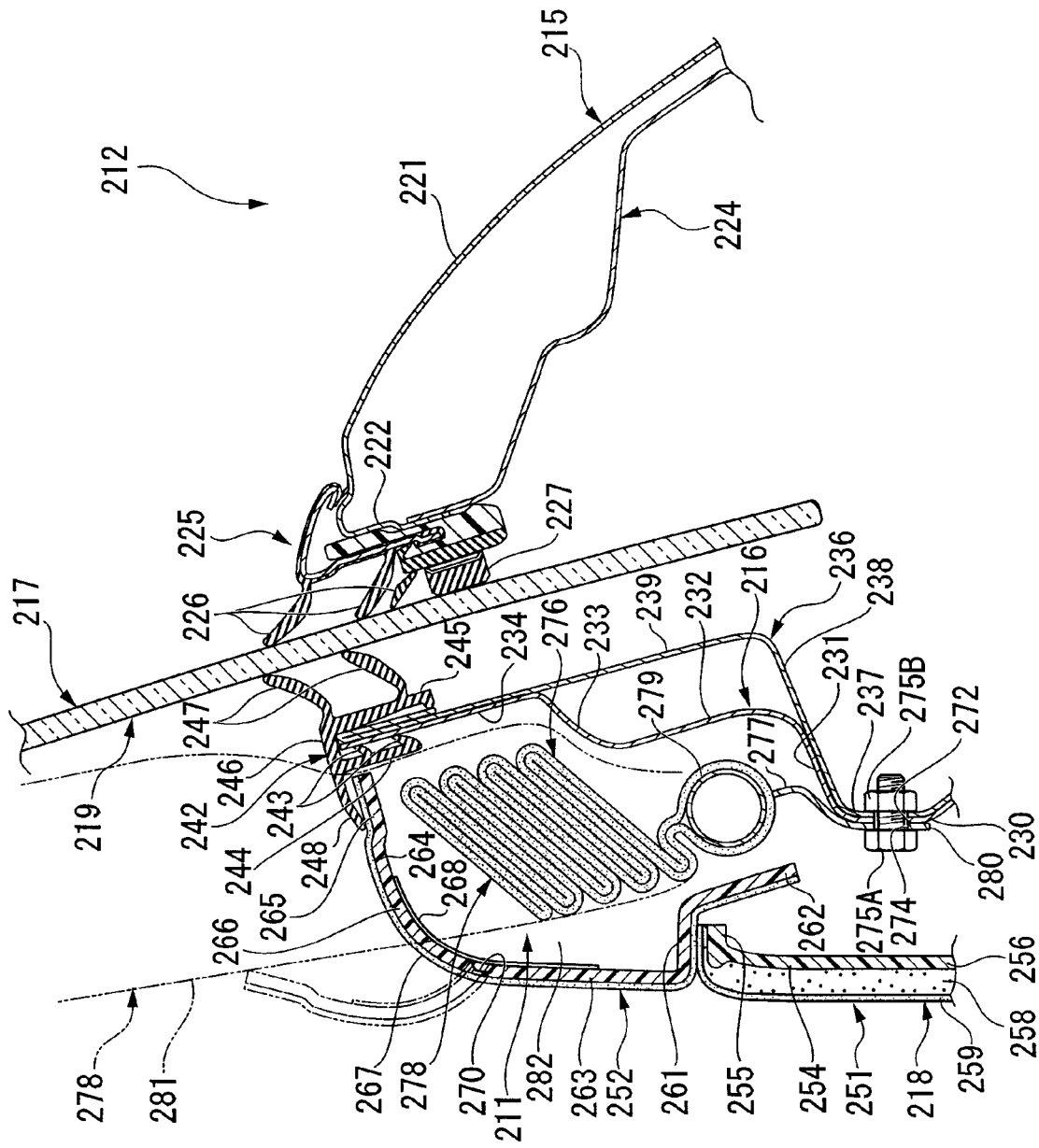
FIG. 13 shows an enlarged cross-sectional view of an upper portion of the door.

FIG. 13 shows a cross sectional view of an upper portion of the door 212 in greater detail. The outer panel 215 includes: an external panel portion 221 which constitutes a design surface of the cabin exterior side, and has an upper portion extending upward while sloping to the cabin interior side; and a joining panel portion 222 which is formed so as to be folded back at the upper portion and extends downward. A metal outer side reinforcement panel 224 which reinforces the upper portion of the outer panel 215 and is formed so as to approach the outer panel 215 side, is joined to the cabin exterior side of a lower portion of the joining panel portion 222. An outer side weather strip 225 is attached to the upper side of a joined portion of the outer panel 215 and the outer side reinforcement panel 224, so as to seal a gap formed between the joined portion and the window glass 217. The outer side weather strip 225 has a plurality of sealing lips 226 arranged in the vertical direction and a square bar-shaped sealing member 227 disposed thereunder. The sealing lips 226 and the sealing member 227 seal the gap by being in contact with the window glass 217.

An upper portion of the inner panel 216 has: an inside plate portion 230 disposed on the cabin interior side; a step plate portion 231 which extends upward while sloping from an upper edge of the inside plate portion 230 toward the cabin exterior side; a middle plate portion 232 which extends upward while sloping from an outer edge portion of the step plate portion 231 on the outside in the vehicle width direction to the cabin interior side; a step plate portion 233 which extends upward while sloping from an upper edge of the middle plate portion 232 toward the cabin exterior side; and an upper plate portion 234 which extends upward while sloping from an outer side edge of the step plate portion 233 in the vehicle width direction to the cabin interior side. A metal inner reinforcing panel 236 is joined to the cabin exterior side of an upper portion of the inner panel 216 for reinforcing the upper portion of the inner panel 216.

The inner reinforcing panel 236 includes: an inside plate portion 237 which is joined to the cabin exterior side of the inside plate portion 230 of the inner panel 216; a step plate portion 238 which extends upward while sloping from an upper edge of the inside plate portion 237 toward the cabin exterior side, and is joined to the bottom side of the step plate portion 231 of the inner panel 216; and an upper plate portion 239 which extends upward while sloping from an outer side edge of the step plate portion 238 in the vehicle width direction to the cabin interior side, and is joined to the cabin exterior side of the upper plate portion 234 of the inner panel 216. The step plate portion 231, the middle plate portion 232, the step plate portion 233, and the upper plate portion 234 of the inner panel 216, together with the step plate portion 238 and the upper plate portion 239 of the inner reinforcing panel 236 form a closed-section structure.

An inner side weather strip 242 is attached at an upper portion of a joined portion of the inner panel 216 and the upper plate portion 239 of the inner reinforcing panel 236 so as to sandwich the upper plate portions 234 and 239; and thereby, sealing a gap formed between the joined portion and the window glass 217. This inner side weather strip 242 includes: a pinching piece 244 which is disposed on the cabin interior side of the upper plate portion 234, and has a plurality of engaging tongue pieces 243 that extend to the cabin exterior side; a pinching piece 245 which is disposed on the cabin exterior side of the upper plate portion 239; and a coupling portion 246 which couples the upper portions of the pinching pieces 244 and 245. The pinching pieces 244 and 245 of the inner side weather strip 242 sandwich the upper plate portions 234 and 239 therebetween. The inner side weather strip 242 includes: a plurality of sealing lips 247 arranged in the vertical direction, and extending from the pinching piece 245 in the direction of the window glass 217, and thereby being contact with the window glass 217; and a contact tongue piece 248 which extends to the cabin interior side to form an approximately coplanar surface with the coupling portion 246.

The door lining 218 includes: a lining body 251 that forms middle and lower portions of the door lining 218; and an upper lining 252 that is disposed between the lining body 251 and the inner side weather strip 242.

An upper portion of the lining body 251 includes: a comparatively hard lining core material 256 which has a main plate portion 254 extending in the vertical direction, and a projection plate portion 255 projecting slightly from an upper end of the main plate portion 254 to the cabin exterior side; a soft lining base material 258 which covers the cabin interior side of the lining core material 256; and a skin material 259 which covers a cabin interior side and an upper side of the lining base material 258.

The upper lining 252 includes: a mounting plate portion 261 which is horizontally arranged on a top of the lining body 251; a support plate portion 262 which extends downward while sloping from a cabin exterior side outer edge of the mounting plate portion 261 to the cabin exterior side; a middle plate portion 263 which extends upward from a cabin interior side inner edge of the mounting plate portion 261; a comparatively hard lining core material 266 having an upper plate portion 264 which extends upward, sloping to the cabin exterior side, while curving from an upper edge of the middle plate portion 263, and a step plate portion 265 which extends to the cabin exterior side while forming a step downward from a cabin exterior side outer edge of the upper plate portion 264; a skin material 267 which completely covers a cabin interior side and an upper side of the lining core material 266; and a covering material 268 which covers a cabin exterior side from a middle plate portion 263 to an upper plate portion 264. The upper lining 252 is joined with and fixed to the upper portion of the lining body 251 at a position of the mounting plate portion 261.

The contact tongue piece 248 of the inner side weather strip 242 contacts with the top side of the step plate portion 265 of the upper lining 252. A groove 270 that extends in the longitudinal direction of the vehicle is formed at a boundary of the middle plate portion 263 and the upper plate portion 264 in the lining core material 266 of the upper lining 252.

A mounting hole 272 is formed in the inside plate portion 230 of the inner panel 216 and the inside plate portion 237 of the inner reinforcing panel 236, so as to penetrate them. An air bag module 276 is attached to the inner panel 216 by: inserting a bolt 275A from the cabin interior side into a mounting hole 274 formed at a bottom portion of the air bag module 276; further inserting the bolt 275A into the mounting hole 272; and thereafter screwing the bolt 275A into a weld nut 275B fixed at the cabin exterior side of the inside plate portion 237 of the inner reinforcing panel 236. The air bag module 276 is housed in an accommodating portion 282 which is formed between the upper portions of the inner panel 216 and the door lining 218 along a lower edge portion of the window 219.

The air bag module 276 includes: a supporting plate 277 which extends upward toward the cabin exterior side from a mounting plate portion 280 in which the mounting hole 274 is formed; an air bag 278 which is mounted to the supporting plate 277 and is folded so as to be successively piled upward while in a shrinking state; an inflator (not illustrated) which is filled with a propellant that generates high pressure gas (fluid) by combustion; and a pipe 279 which is fitted into the inside of the air bag 278 on the supporting plate 277 side, and connects between the inflator and the inside of the bottom portion of the air bag 278.

The air bag 278 is folded so as to be piled successively upward with respect to the pipe 279 being the gas supply portion. Therefore, when the air bag 278 is developed by the gas generated by the inflator, the air bag 278 basically develops upward. Furthermore, the pipe 279 is disposed at a position under an upper end portion of the inner panel 216; therefore, a bottom portion of an expanding portion 281 expanding upward from the pipe 279 and the inner panel 216 overlap with each other at a predetermined length along the vertical direction.

Figure 14:
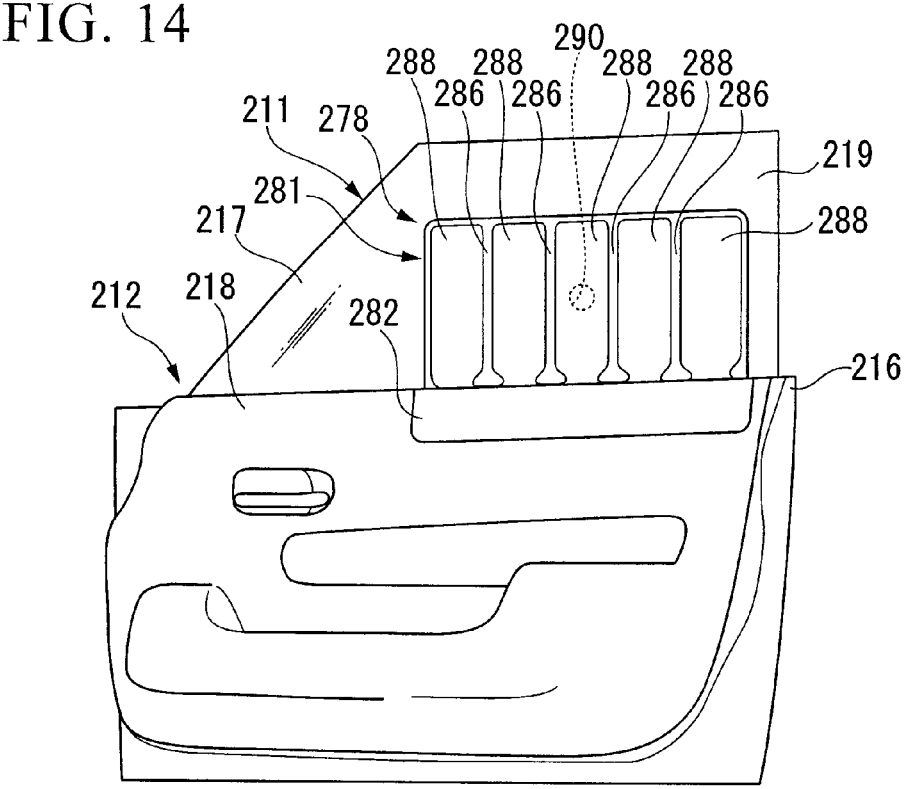
FIG. 14 shows a side view of the door when the door is viewed from a cabin interior side.
Figure 15:
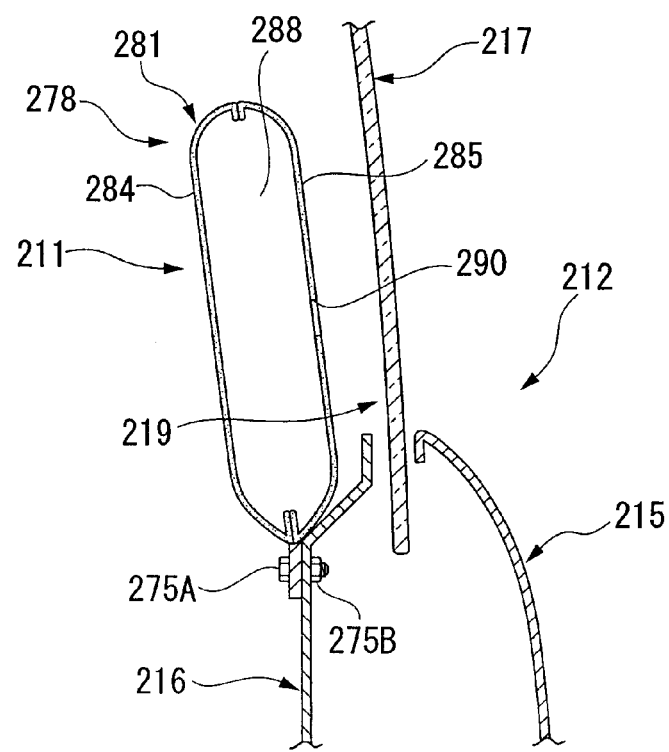
FIG. 15 shows an enlarged cross-sectional view of the upper portion of the door.

As shown in FIG. 14, the expanded air bag 278 has long shape along the vehicle length direction. As shown in FIG. 15, the air bag 278 is made in a bag shape by sewing outer edge portions of a base fabric 284 on the vehicle interior side and a base fabric 285 on the vehicle exterior side together. As shown in FIG. 14, the expanding portion 281 which expands while developing the air bag 278 includes a plurality of cells 288 each of which expands in a cylindrical shape so as to extend in the vertical direction, and which are arranged side-by-side in the vehicle longitudinal direction. The expanding portion 281 is formed by joining the base fabrics 284 and 285 together by sewing, adhesion or weaving such as jacquard weaving. The air bag 278 further includes non-expanding portions 286 which are formed between the cells 288 and which do not expand. The air bag 278 as a whole inflates in a plate shape.

The air bag 278 of the present embodiment includes a vent hole 290 formed therein so as to face the window 219 side while developing the air bag 278. That is, the vent hole 290 is formed at a middle position in the vertical direction of a portion which forms the center cell 288 of the base fabric 285 on the window 219 side while developing the air bag 278, so as to direct the window 217. With this construction, while developing the air bag 278, a part of gas is ejected from the vent hole 290 to the window glass 217.

In the air bag device 211 of the present embodiment, when the deployment condition is met during a vehicle collision, such as a G-force equal to or greater than a predetermined amount being detected, the inflator ignites. Then the folded-up air bag 278 is expanded by the gas generated by the inflator. Since the air bag 278 is folded in a manner to be successively overlapped upward, it develops so as to extend upward from below the window 219 as shown by the double-dashed line shown in FIG. 13. During deployment, the air bag 278 mainly presses the upper plate portion 264 in the upper lining 252. Thereby, an upper portion of the upper plate portion 264 is rotated so as to override the contact tongue piece 248 centering on the weak groove 270. Thereafter, the air bag 278 develops upward along the inner surface of the window glass 217 of the window 219 above. Furthermore, in especially at the end of developing process, a gas is ejected from the vent hole 290 to the window glass 217 side. The air bag 278 develops while maintaining the predetermined distance with respect to the window glass 217 and while slightly being inclined in the vehicle interior side, by a thrust force generated by the ejected gas. Accordingly, a reaction force (i.e., a force for pressing an occupant back into the cabin interior side) produced by the air bag 278 when the occupant contacts thereto can be increased. It becomes possible to precisely control the internal pressure, the developing direction, the reaction force, and the like of the air bag 278 by setting at least one of the number, the dimension, and the position, of the vent hole 290.

According to the air bag device 211 of the present embodiment explained in the above, since the vent hole 290 is formed in the air bag 278, it is possible to precisely control the internal pressure of the air bag 278 by setting at least one of the shape, the dimension, the number, and the position, of the vent hole 290. In addition, since the vent hole 290 directs the cabin exterior side, it becomes possible to prevent unintentional blocking of gas exhausted from the vent hole 290. As the result, it is possible to reliably control the internal pressure of the air bag 278. Furthermore, since the vent hole 290 is directed to the window glass 217 side of the window 219, the air bag 278 can be developed toward the cabin interior side by a thrust force generated by the gas exhausted from the vent hole 290. Furthermore, the reaction force produced by the air bag 278 when the occupant contacts thereto can be increased.

Fourth Embodiment

Figure 16:
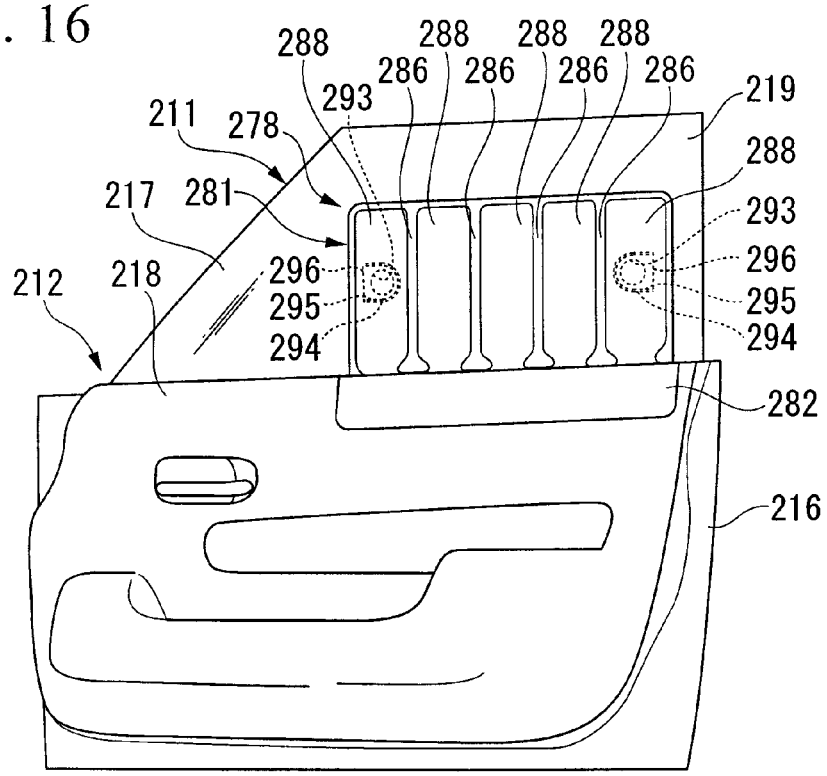
FIG. 16 shows a side view of a door provided with an air bag according to a fourth embodiment of the present invention, when the door is viewed from a cabin interior side.
Figure 17:
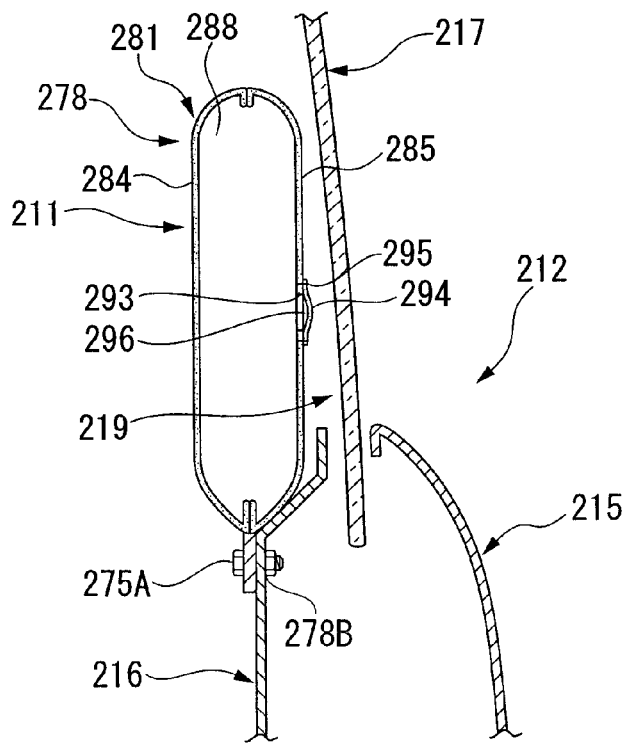
FIG. 17 shows an enlarged cross-sectional view of an upper portion of the door.

Next, an air bag device according to a fourth embodiment of the present invention will be explained below with reference to FIGS. 16 and 17. In the following explanation, differences of the present embodiment with respect to the above-mentioned third embodiment will be mainly explained. The same symbols will be added to the same constituent members as those of the third embodiment, and explanation thereof will be omitted here.

In the air bag device 211 of the present embodiment, hole portions 293 are formed at the middle positions in the vertical direction of portions which form the cells 288 on the both end sides, of the base fabric 285 disposed on the window glass 217 side of the window 219 while developing the air bag 278. Covers 294 are fixed to the external side of the base fabric 285 by sewing so as to cover the hole portions 293. These covers 294 do not have sewing portions 295 partially. Therefore, non-sewing portions between the covers 294 and the base fabric 285 form vent holes 296. The non-sewing portions between the covers 294 and the base fabric 285 are formed so as to direct the opposite directions each other along the longitudinal direction of the air bag 278. Therefore, the vent holes 296 direct in the length direction of the air bag 278 (i.e., the lateral direction of the window 219 or the vehicle longitudinal direction), and further direct the opposite directions each other. While developing the air bag 278, a part of gas is ejected from the vent holes 296 toward the window 219 side, and they flow along the inner surface of the window 219 in the opposite directions with each other.

According to the air bag device 211 of the present embodiment explained in the above, since the vent holes 296 direct in the length direction of the air bag 278, it is possible to suppress vibrations in the length direction of the air bag 278, by a thrust force of the gas exhausted from the vent holes 296. Moreover, it is not always necessary to provide the two vent holes 296 (i.e., providing the vent hole 296 for each side of the air bag 278), and it is also acceptable to provide only one vent hole 296 if necessary.

Figure 18:
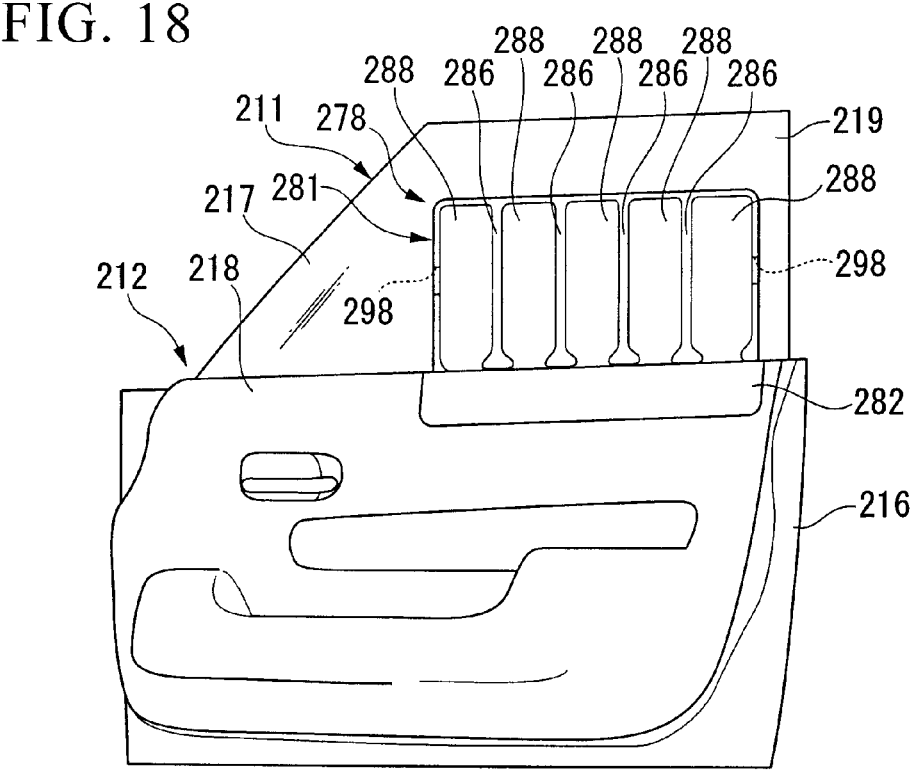
FIG. 18 shows a side view of the door provided with a variant example of the same air bag device, when the door is viewed from a cabin interior side.
Figure 19:
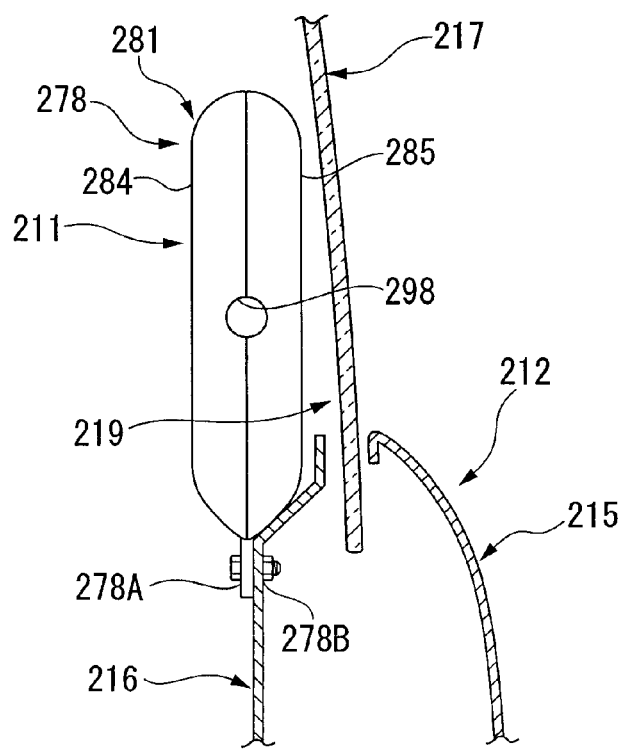
FIG. 19 shows an enlarged cross-sectional view of an upper portion of the door.

In the air bag device 211 of the present embodiment, another vent hole may be adopted if only it directs the longitudinal direction of the air bag 278. For example, as shown in FIGS. 18 and 19, it is possible to adopt vent holes 296 which are formed on outer end side joining portions of the base fabrics 284 and 285 at which the cells 288 on the both end sides while developing the air bag 278 are formed. Also in this case, the vent holes 298 direct the longitudinal direction of the air bag 278 (i.e., the lateral direction of the window 219 or the vehicle longitudinal direction), and further direct the opposite directions each other. Moreover, it is not always necessary to provide the two vent holes 298 (i.e., providing the vent hole 298 for each side of the air bag 278), and it is also acceptable to provide only one vent hole 298 if necessary.

Fifth Embodiment

Figure 20:
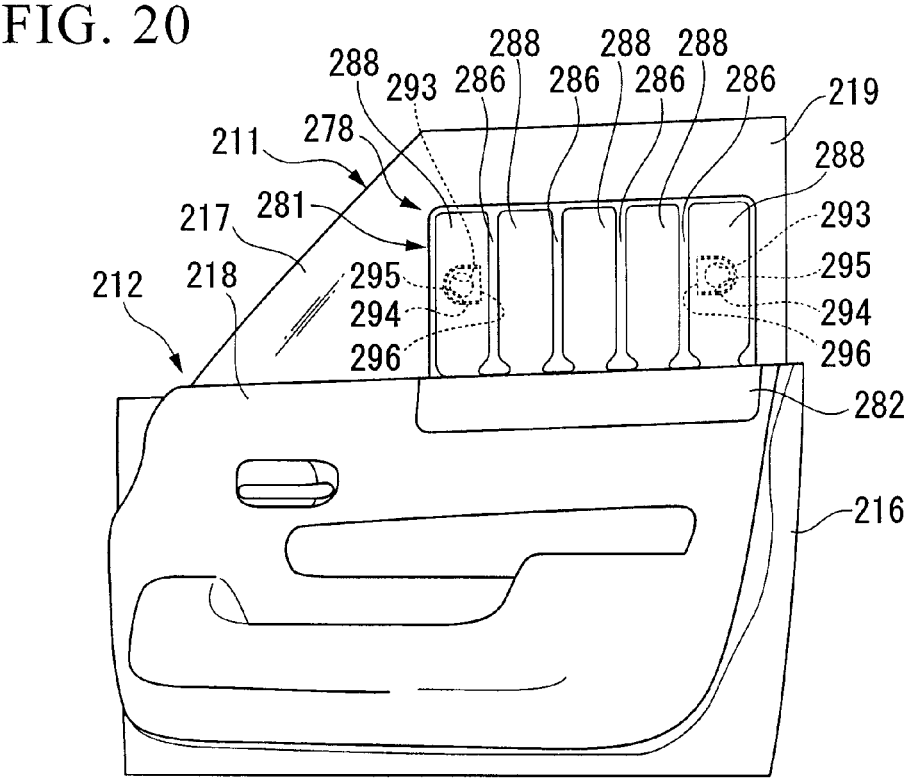
FIG. 20 shows a side view of a door provided with an air bag according to a fifth embodiment of the present invention, when the door is viewed from a cabin interior side.
Figure 21:
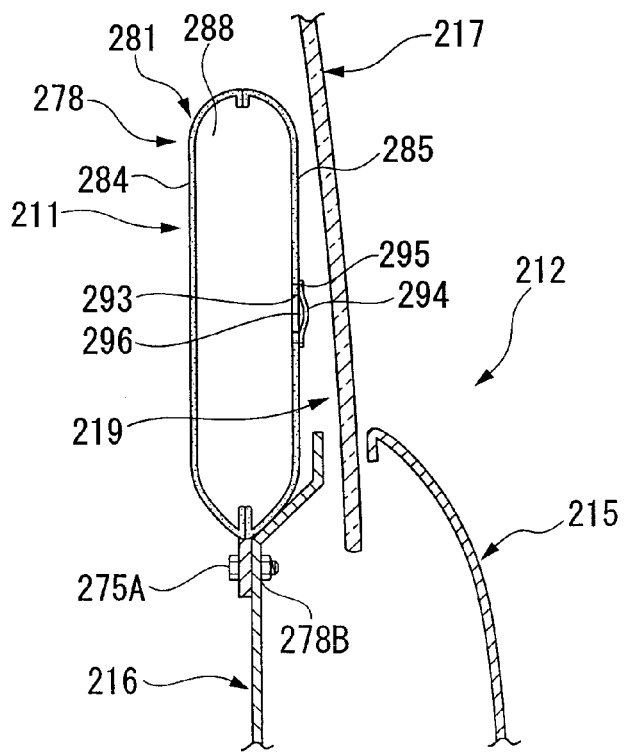
FIG. 21 shows an enlarged cross-sectional view of an upper portion of the door provided with the same air bag device.

Next, an air bag device according to a fifth embodiment of the present invention will be explained below with reference to FIGS. 20 and 21. In the following explanation, differences of the present embodiment with respect to the above-mentioned fourth embodiment will be mainly explained. The same symbols will be added to the same constituent members as those of the fourth embodiment, and explanation thereof will be omitted here.

In the air bag device 211 of the present embodiment, as same as in the above-mentioned fourth embodiment, hole portions 293 are formed at the middle positions in the vertical direction of portions at which the cells 288 on the both end sides are formed, in the base fabric 285 disposed on the window glass 217 side of the window 219 while developing the air bag 278. Covers 294 are fixed to the external side of the base fabric 285 by sewing them so as to cover the hole portions 293. Non-sewing portions between the covers 294 and the base fabric 285 except sewing portions 295 form vent holes 296. In the present embodiment, the non-sewing portions between the covers 294 and the base fabric 285 are formed so as to direct the same direction each other along the longitudinal direction of the air bag 278. Therefore, the vent holes 296 direct in the length direction of the air bag 278 (i.e., the lateral direction of the window 219 or the vehicle longitudinal direction), and further direct the direction facing with each other. Accordingly, while developing the air bag 278, a part of gas is ejected from the vent holes 296 toward the window 219 side, and they flow along the inner surface of the window 219 in the approaching direction with each other.

According to the air bag device 211 of the present embodiment explained in the above, the vent holes 296 direct in the length direction of the air bag 278 so as to face with each other. Accordingly, the ejected gas has less possibility of being blocked by members such as a pillar around there; therefore, the ejected gas can work more appropriately. Moreover, it is not always necessary to provide two vent holes 296 (i.e., providing the vent hole 296 for each side of the air bag 278), and it is also acceptable to provide only one vent hole 296 if necessary.

Sixth Embodiment

Figure 22:
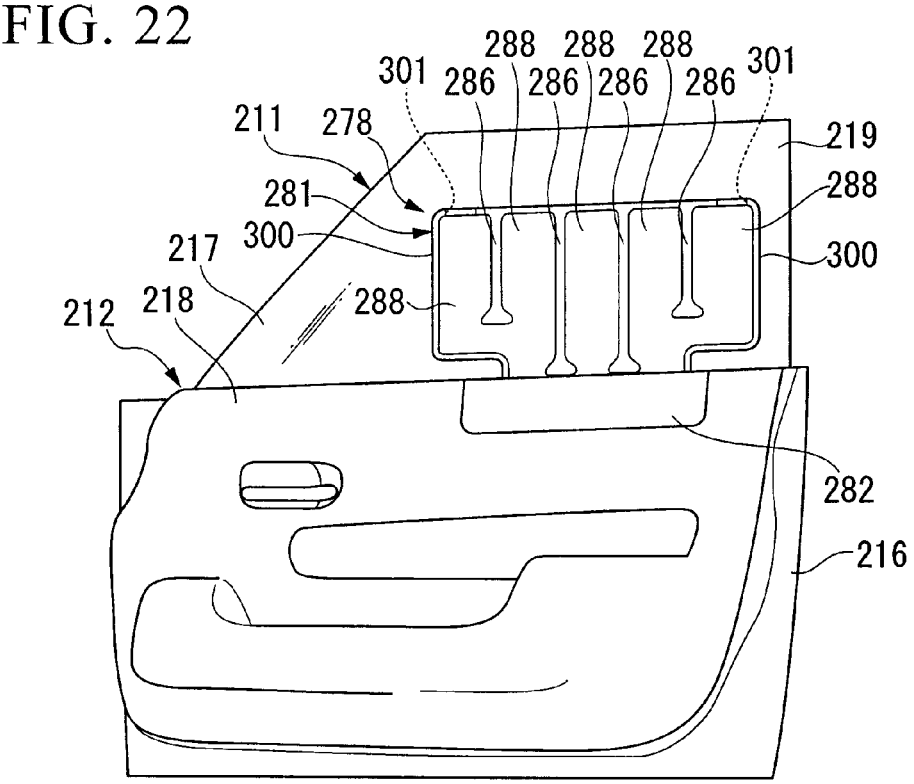
FIG. 22 shows a side view of a door provided with an air bag according to a six embodiment of the present invention, when the door is viewed from a cabin interior side.
Figure 23:
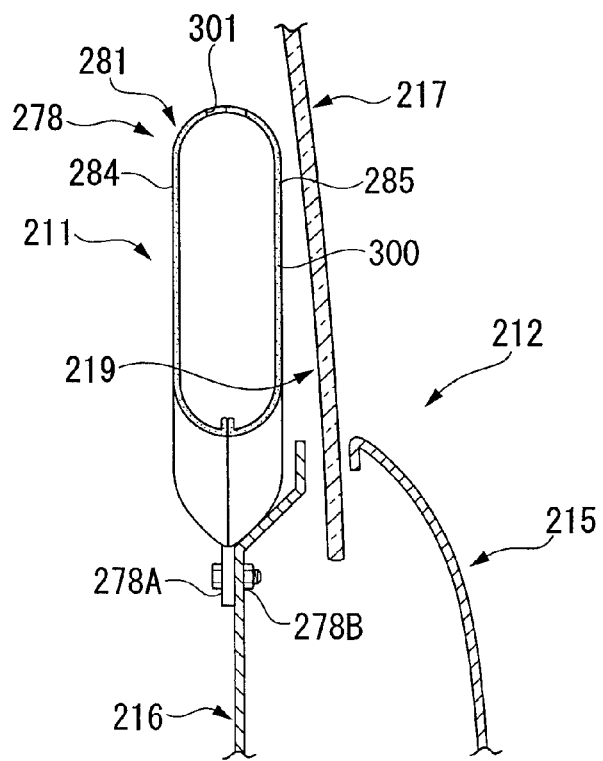
FIG. 23 shows an enlarged cross-sectional view of an upper portion of the door.

Next, an air bag device according to a sixth embodiment of the present invention will be explained below with reference to FIGS. 22 and 23. In the following explanation, differences of the present embodiment with respect to the above-mentioned fifth embodiment will be mainly explained. The same symbols will be added to the same constituent members as those of the fifth embodiment, and explanation thereof will be omitted here.

In the air bag device 211 of the present embodiment, the air bag 278 is provided with expanding portions 300 which expand in the longitudinal direction from both ends of the developed air bag 278. These expanding portions 300 are protruded from a part of the accommodating portion 282 where is on the upper side (i.e., window side) than the accommodating portion 282 while developing the air bag 278, and where is between the middle to the top of the air bag 278 in the vertical direction. And both of the expanding portions 300 overhang from the accommodating portion 282.

Vent holes 301 are formed on tops of the expanding portions 300 on the both sides of the air bag 278. That is, the vent holes 301 are formed so as to direct upward at upper end joining portions between the base fabrics 284 and 285, of the cells 288 provided on expanding portions 300 on both end sides along the longitudinal direction of the expanded air bag 278.

According to the air bag device 211 of the present embodiment explained in the above, since the vent holes 301 are provided on the tops of the expanding portions 300 so as to direct upward, it is possible to suppress vibrations in the vertical direction of the expanding portions 300 while developing the air bag 278, by a thrust force of the gas exhausted from the vent holes 301.

Moreover, in the case in which only one expanding portion 300 is formed on the air bag 278, the vent hole 301 will be formed only to the top of the formed expanding portion 300.

Seventh Embodiment

Figure 24:
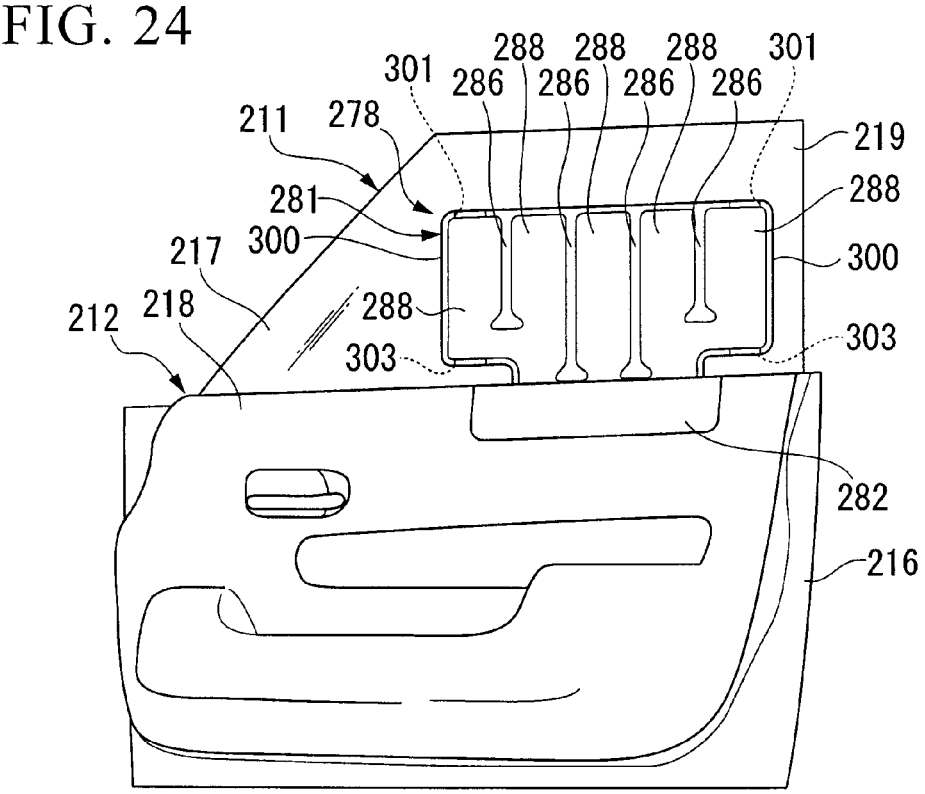
FIG. 24 shows a side view of a door provided with an air bag according to a seventh embodiment of the present invention, when the door is viewed from a cabin interior side.
Figure 25:
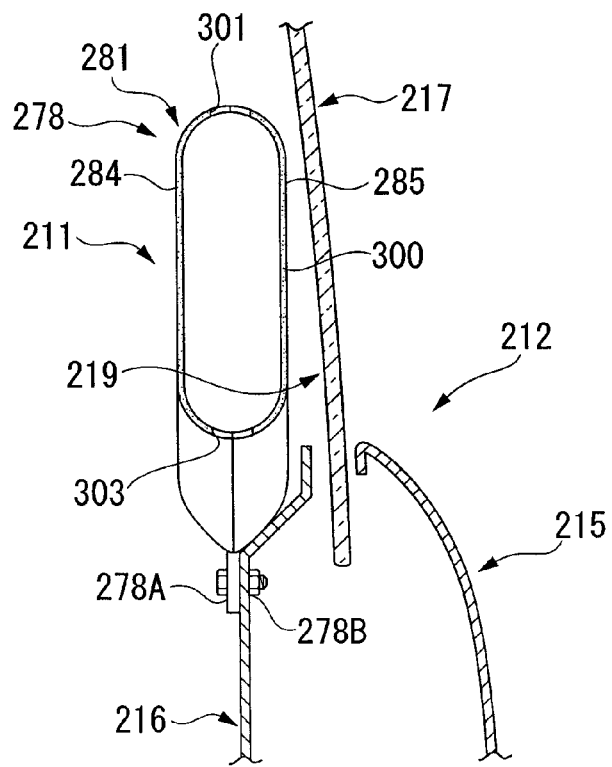
FIG. 25 shows an enlarged cross-sectional view of an upper portion of the door.

Next, an air bag device according to a seventh embodiment of the present invention will be explained below with reference to FIGS. 24 and 25. In the following explanation, differences of the present embodiment with respect to the abovementioned sixth embodiment will be mainly explained. The same symbols will be added to the same constituent members as those of the sixth embodiment, and explanation thereof will be omitted here.

In the air bag device 211 of the present embodiment, the vent holes 303 are also formed on the bottom portions of the expanding portions 300 on the both sides of the air bag 278. That is, the vent holes 303 are formed so as to direct downward at bottom end joining portions between the base fabrics 284 and 285, of the cells 288 provided on expanding portions 300 on both end sides thereof along the longitudinal direction of the expanded air bag 278.

According to the air bag device 211 of the present embodiment explained in the above, since the vent holes 303 are also provided on the bottom portions of the expanding portions 303 in addition to the upper portion thereof, and since the vent holes 301 directs upward while the vent holes 303 direct downward on the vehicle exterior side, it is possible to suppress vibrations in the vertical direction of the expanding portions 300 while developing the air bag 278, by a thrust force of the gas exhausted from the vent holes 301 and 303.

Moreover, in the case in which only one expanding portion 300 is formed on the air bag 278, the vent hole 301 will be formed only to the top of the formed expanding portion 300 and the vent hole 303 will be formed only to the bottom of the formed expanding portion 300.

In each embodiment explained in the above, the vent holes 290, 296, 298, 301, and 303 are formed in the air bag 278 so as to direct the cabin exterior side, where the "cabin exterior side" indicates all directions except for the cabin interior side, that is, all directions except for the direction the window 219 faces. Specifically, the "cabin exterior side" includes all directions including the direction facing the window 219, the vertical direction along the window 219, the lateral direction along the window 219, and the oblique direction along the window 219.

Moreover, the shape, the size, the number, the position, and the like are not limited to those mentioned in the above first to seventh embodiments, and can be modified according to the necessity.

In addition, in the explanations of each embodiment, explanations were given in the aforementioned embodiments using as examples the air bag devices provided in the door of the vehicle. However, the present invention is not limited thereto. It may be applied as long as it is disposed near a window and develops an air bag along the inner surface of a window. For example, it may be applied to: an air bag device that is provided below a rear side window in a coupe-type vehicle; an air bag device that is provided below a tailgate window; and to a side-curtain air bag device that is provided to a roof side rail on a top side of the window.

Furthermore, the aforementioned embodiments may be arranged such that the opening degree, the opening direction of the vent holes be controlled in accordance with the opening-and-closing status and/or the damage status of the window 219. For example, a status detecting device for detecting the status of the window may be provided to a regulator which raises and lowers the window. In this case, the opening degree, the opening direction, and the like of the vent holes can be controlled in accordance with the detected status such as the opening-and-closing position of the window or the damage condition estimated from the weight of the window detected by the status detecting device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An air bag device, comprising:
   an air bag which is arranged between an under-window panel and a lining that covers a cabin interior side thereof, and develops upwardly along an inner surface of a window; and
   a pressing member with a main plate portion and a curving plate portion, said main plate portion extending upwardly from between the lining and the air bag, said curving plate portion extending from the main plate portion toward the lining, wherein the pressing member presses a bottom portion of the air bag toward the under-window panel and the window while the air bag is being developed, wherein
   the bottom portion of the air bag and the under-window panel overlap with each other at a predetermined length along a vertical direction.

2. The air bag device according to claim 1, wherein
   the pressing member is a plate member which covers a cabin interior side of the bottom portion while developing the air bag, and has a shape which prevents blocking of a developing direction of the air bag.

3. The air bag device according to claim 2, wherein
   an upper portion of the pressing member inclines toward the cabin interior side.

4. The air bag device according to claim 1, wherein
   the pressing member is a connecting member which is attached to the under-window panel while developing the air bag.

* * * * *